US012553918B2

(12) United States Patent
Tanaka

(10) Patent No.: US 12,553,918 B2
(45) Date of Patent: *Feb. 17, 2026

(54) PHYSICAL QUANTITY SENSOR, PHYSICAL QUANTITY SENSOR DEVICE, AND INERTIAL MEASUREMENT UNIT

(71) Applicant: SEIKO EPSON CORPORATION, Tokyo (JP)

(72) Inventor: Satoru Tanaka, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,182

(22) Filed: Apr. 23, 2024

(65) Prior Publication Data

US 2024/0272195 A1 Aug. 15, 2024

Related U.S. Application Data

(63) Continuation of application No. 17/511,659, filed on Oct. 27, 2021, now Pat. No. 12,153,064.

(30) Foreign Application Priority Data

Oct. 28, 2020 (JP) ................. 2020-180122

(51) Int. Cl.
*G01P 15/125* (2006.01)
*G01P 1/00* (2006.01)
(Continued)

(52) U.S. Cl.
CPC ............. *G01P 15/125* (2013.01); *G01P 1/00* (2013.01); *G01P 15/18* (2013.01);
(Continued)

(58) Field of Classification Search
None
See application file for complete search history.

(56) References Cited

U.S. PATENT DOCUMENTS 12,153,064 B2 * 11/2024 Tanaka ................... G01P 15/18
2006/0169043 A1 8/2006 McNeil
(Continued)

FOREIGN PATENT DOCUMENTS

| CN | 101738492 A | 6/2010 |
| CN | 104849493 A | 8/2015 |

(Continued)

*Primary Examiner* — Ruben C Parco, Jr.
(74) *Attorney, Agent, or Firm* — Harness, Dickey & Pierce, P.L.C.

(57) ABSTRACT

A physical quantity sensor includes a substrate that has a first fixed electrode and a movable body that has a first mass portion facing the first fixed electrode. The first mass portion includes a first region, and a second region farther from the rotation axis than the first region, a first through-hole group is provided in the first region, and a second through-hole group is provided in the second region, and the movable body has a first surface on a substrate side, and a second surface. The first surface of the first mass portion is provided with a step or a slope such that a first gap distance of a first gap between the first mass portion and the first fixed electrode in the first region is smaller than a second gap distance of a second gap between the first mass portion and the first fixed electrode in the second region. A depth of through-holes of the first through-hole group and the second through-hole group is smaller than a maximum thickness of the movable body.

18 Claims, 23 Drawing Sheets

(51) Int. Cl.
*G01P 15/18* (2013.01)
*G01P 15/08* (2006.01)

(52) U.S. Cl.
CPC ............. *G01P 2015/0831* (2013.01); *G01P 2015/0871* (2013.01); *G01P 2015/0874* (2013.01)

(56) References Cited

U.S. PATENT DOCUMENTS

| | | | |
|---|---|---|---|
| 2009/0031809 A1* | 2/2009 | Lin | G01P 15/125 73/514.32 |
| 2010/0024553 A1 | 2/2010 | Classen et al. | |
| 2011/0048131 A1 | 3/2011 | Reinmuth | |
| 2011/0164294 A1 | 7/2011 | Shimizu | |
| 2013/0042684 A1 | 2/2013 | Yoda | |
| 2013/0106241 A1 | 5/2013 | Cazzaniga et al. | |
| 2013/0167641 A1 | 7/2013 | Heller | |
| 2013/0192370 A1 | 8/2013 | Yoda | |
| 2013/0263662 A1* | 10/2013 | Tanaka | G01P 15/0802 73/504.12 |
| 2014/0338451 A1* | 11/2014 | Takagi | G01P 15/125 73/514.32 |
| 2015/0020591 A1 | 1/2015 | Tanaka | |
| 2015/0096378 A1 | 4/2015 | Kigure | |
| 2015/0233966 A1* | 8/2015 | Scheurle | G01P 15/125 73/514.32 |
| 2015/0241216 A1 | 8/2015 | Ahtee et al. | |
| 2015/0241466 A1* | 8/2015 | Tanaka | G01P 15/125 73/514.32 |
| 2015/0316582 A1 | 11/2015 | Tanaka | |
| 2016/0139172 A1* | 5/2016 | Scheurle | G01P 15/125 73/514.32 |
| 2016/0313462 A1 | 10/2016 | Ullrich et al. | |
| 2017/0088413 A1 | 3/2017 | Tanaka | |
| 2017/0341927 A1 | 11/2017 | Pekka Herzogenrath et al. | |
| 2018/0252745 A1 | 9/2018 | Isobe et al. | |
| 2018/0273375 A1 | 9/2018 | Tanaka | |
| 2018/0275162 A1 | 9/2018 | Tanaka | |
| 2018/0275163 A1 | 9/2018 | Tanaka | |
| 2019/0025338 A1* | 1/2019 | Matsuura | H10D 48/50 |
| 2019/0063924 A1 | 2/2019 | Tanaka | |
| 2019/0120872 A1 | 4/2019 | Geisberger | |
| 2019/0162539 A1 | 5/2019 | Kihara | |
| 2019/0302142 A1 | 10/2019 | Tanaka | |
| 2020/0216305 A1 | 7/2020 | Rizzini et al. | |
| 2021/0123944 A1 | 4/2021 | Tanaka | |
| 2021/0255212 A1 | 8/2021 | Nagata et al. | |

FOREIGN PATENT DOCUMENTS

| | | |
|---|---|---|
| CN | 105600736 A | 5/2016 |
| CN | 107010588 A | 8/2017 |
| CN | 210690623 U | 6/2020 |
| DE | 102014202816 A1 | 8/2015 |
| JP | 2007-209550 A | 8/2007 |
| JP | 2008-529001 A | 7/2008 |
| JP | 2010-536036 A | 11/2010 |
| JP | 2012-088120 A | 5/2012 |
| JP | 2012-181030 A | 9/2012 |
| JP | 2013-040856 A | 2/2013 |
| JP | 2013-140148 A | 7/2013 |
| JP | 2013-156121 A | 8/2013 |
| JP | 2013-217721 A | 10/2013 |
| JP | 2014-149234 A | 8/2014 |
| JP | 2015-021786 A | 2/2015 |
| JP | 2015-072188 A | 4/2015 |
| JP | 2015-212624 A | 11/2015 |
| JP | 2017-053675 A | 3/2017 |
| JP | 2017-509494 A | 4/2017 |
| JP | 2017-146312 A | 8/2017 |
| JP | 2018-163118 A | 10/2018 |
| JP | 2018-163119 A | 10/2018 |
| JP | 2018-163120 A | 10/2018 |
| JP | 2019-045172 A | 3/2019 |
| JP | 2019-066294 A | 4/2019 |
| JP | 2019-100726 A | 6/2019 |
| JP | 2019-184261 A | 10/2019 |
| JP | 2021-067546 A | 4/2021 |
| JP | 2021-131286 A | 9/2021 |
| WO | 2017-046866 A1 | 3/2017 |

* cited by examiner

PHYSICAL QUANTITY SENSOR, PHYSICAL QUANTITY SENSOR DEVICE, AND INERTIAL MEASUREMENT UNIT

The present application is a continuation of U.S. patent application Ser. No. 17/511,659 filed Oct. 27, 2021, which is based on, and claims priority from JP Application Serial Number 2020-180122, filed Oct. 28, 2020, the disclosures of which are hereby incorporated by reference herein in their entireties.

BACKGROUND

1. Technical Field

The present disclosure relates to a physical quantity sensor, a physical quantity sensor device, an inertial measurement unit, and the like.

2. Related Art

In the related art, there is a physical quantity sensor that detects a physical quantity such as acceleration. As such a physical quantity sensor, for example, a see-saw type acceleration sensor that detects acceleration in a Z axis direction is known. For example, JP-A-2013-040856 discloses an acceleration sensor that realizes high sensitivity by forming a plurality of gaps between electrodes by providing a step at a detector on a substrate. JP-T-2008-529001 discloses an acceleration sensor that realizes high sensitivity by forming a plurality of gaps between electrodes by providing a step at a rear surface side of a movable body. US-A-2017/0341927 discloses an acceleration sensor in which a thickness is reduced by forming a region facing a detection electrode into a recess shape in a section of a movable body, and the movable body is interposed between upper and lower detection electrodes to reduce the damping. JP-A-2019-184261 discloses a function equation which is a normalized equation for realizing high sensitivity and low damping.

In JP-A-2013-040856, since a thickness of a movable body is uniform and a depth of a through-hole is uniform, hole damping in the through-hole tends to be large. In JP-T-2008-529001, since the movable body does not have a through-hole, damping is very large and a desired frequency bandwidth cannot be secured. In US-A-2017/0341927 and JP-A-2019-184261, since a gap distance between electrodes is constant, it is difficult to further increase the sensitivity. As described above, the structures of JP-A-2013-040856 to JP-A-2019-184261 have a problem that it is difficult to realize both higher sensitivity and lower damping at the same time.

SUMMARY

An aspect of the present disclosure relates to a physical quantity sensor including a substrate that is orthogonal to a Z axis when three axes orthogonal to each other are defined as an X axis, a Y axis, and a Z axis, and on which a first fixed electrode is provided; and a movable body that has a first mass portion facing the first fixed electrode in a Z axis direction along the Z axis and is configured to swing with respect to the substrate about a rotation axis along the Y axis, in which the first mass portion includes a first region, and a second region farther from the rotation axis than the first region, a first through-hole group is provided in the first region, and a second through-hole group is provided in the second region, the movable body has a first surface that is a surface on a substrate side, and a second surface that is a surface on a rear side with respect to the first surface, the first surface of the first mass portion is provided with a step or a slope such that a first gap distance in the Z axis direction of a first gap that is a gap between the first mass portion and the first fixed electrode in the first region is smaller than a second gap distance in the Z axis direction of a second gap that is a gap between the first mass portion and the first fixed electrode in the second region, and a depth in the Z axis direction of through-holes of the first through-hole group and the second through-hole group is smaller than a maximum thickness in the Z axis direction of the movable body.

Another aspect of the present disclosure relates to a physical quantity sensor device including the above physical quantity sensor; and an electronic component that is electrically coupled to the physical quantity sensor.

Still another aspect of the present disclosure relates to an inertial measurement unit including the above physical quantity sensor and a controller that performs control based on a detection signal output from the physical quantity sensor.

DESCRIPTION OF EXEMPLARY EMBODIMENTS

Hereinafter, the present embodiment will be described. The present embodiment described below does not unreasonably limit the description of the appended claims. Moreover, not all of the configurations described in the present embodiment are essential configuration requirements. In each of the following drawings, some constituents may be omitted for convenience of description. In each drawing, a dimensional ratio of each constituent is different from the actual one for better understanding.

1. First Embodiment

Figure 1:
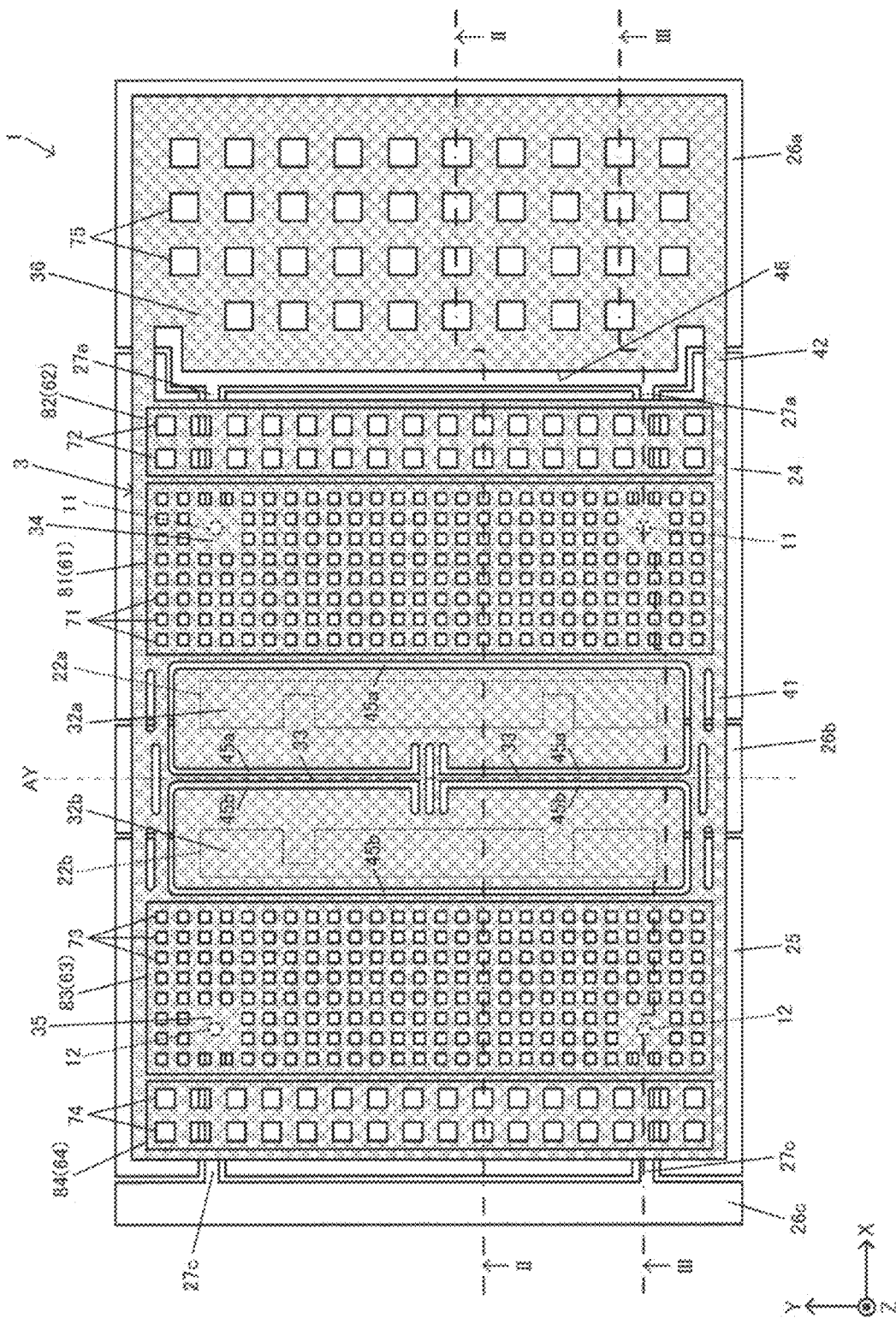
FIG. 1 is a plan view of a physical quantity sensor of a first embodiment.
Figure 2:
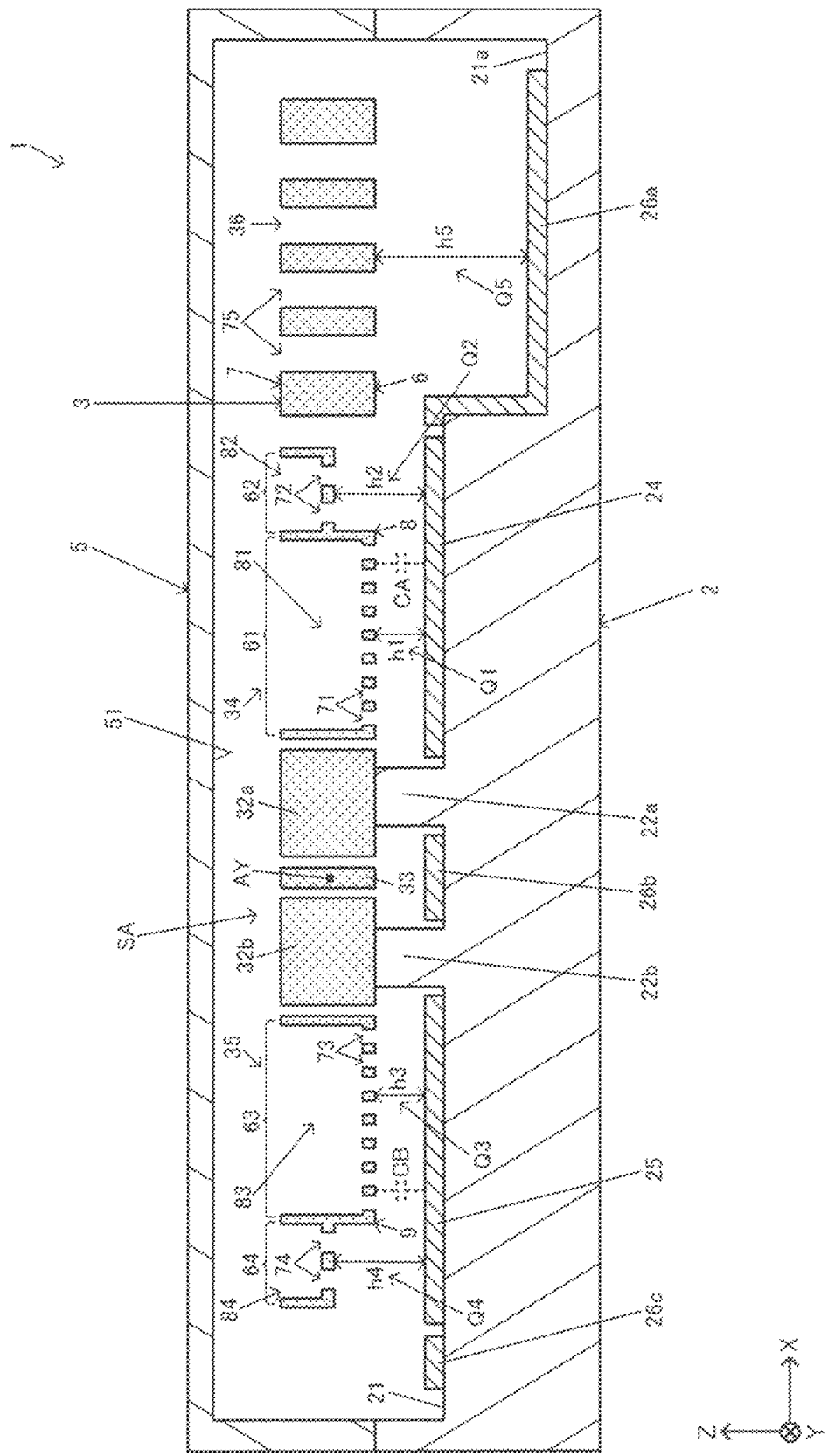
FIG. 2 is a sectional view taken along the line II-II in FIG. 1.
Figure 3:
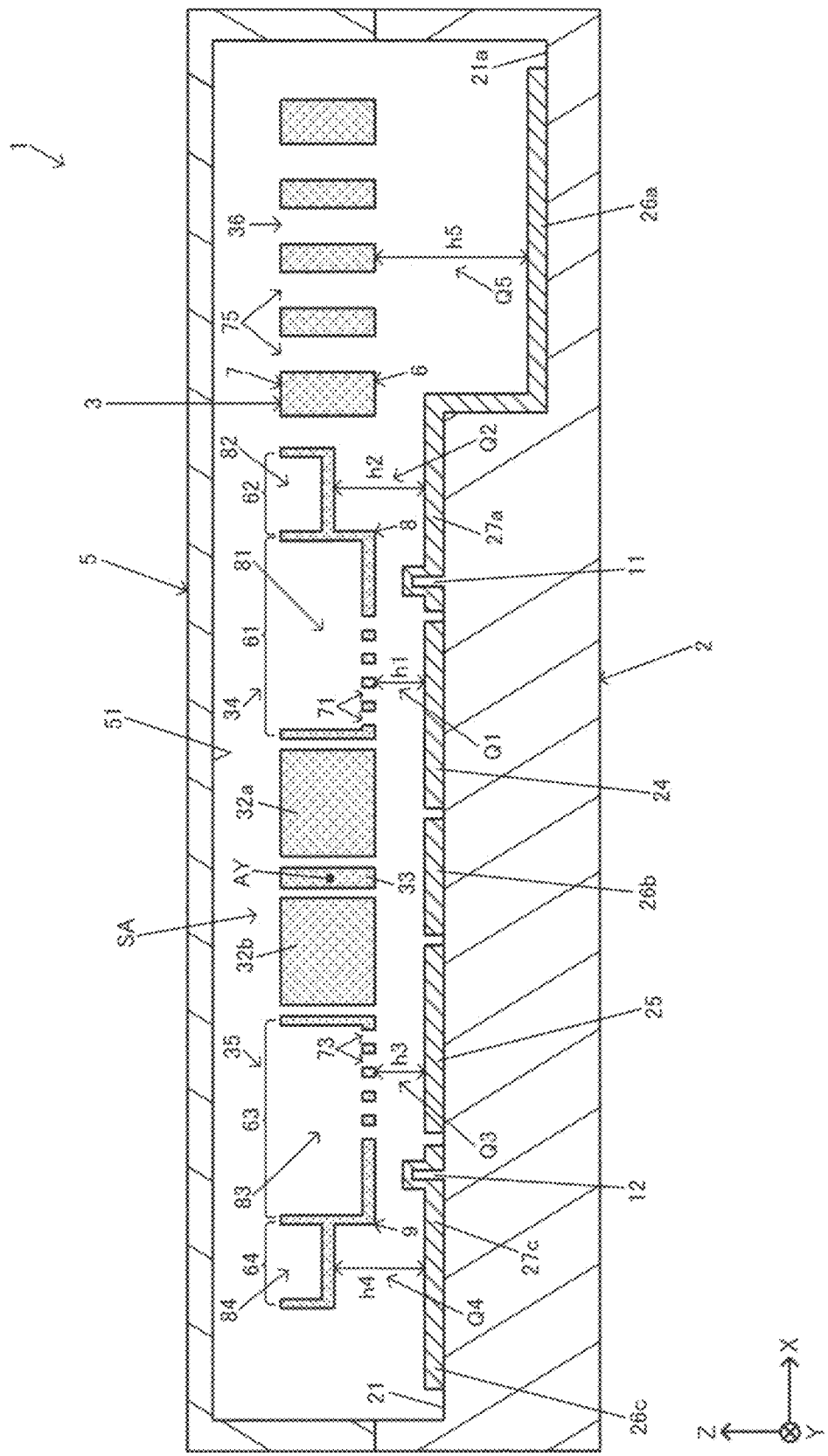
FIG. 3 is a sectional view taken along the line III-III of FIG. 1.
Figure 4:
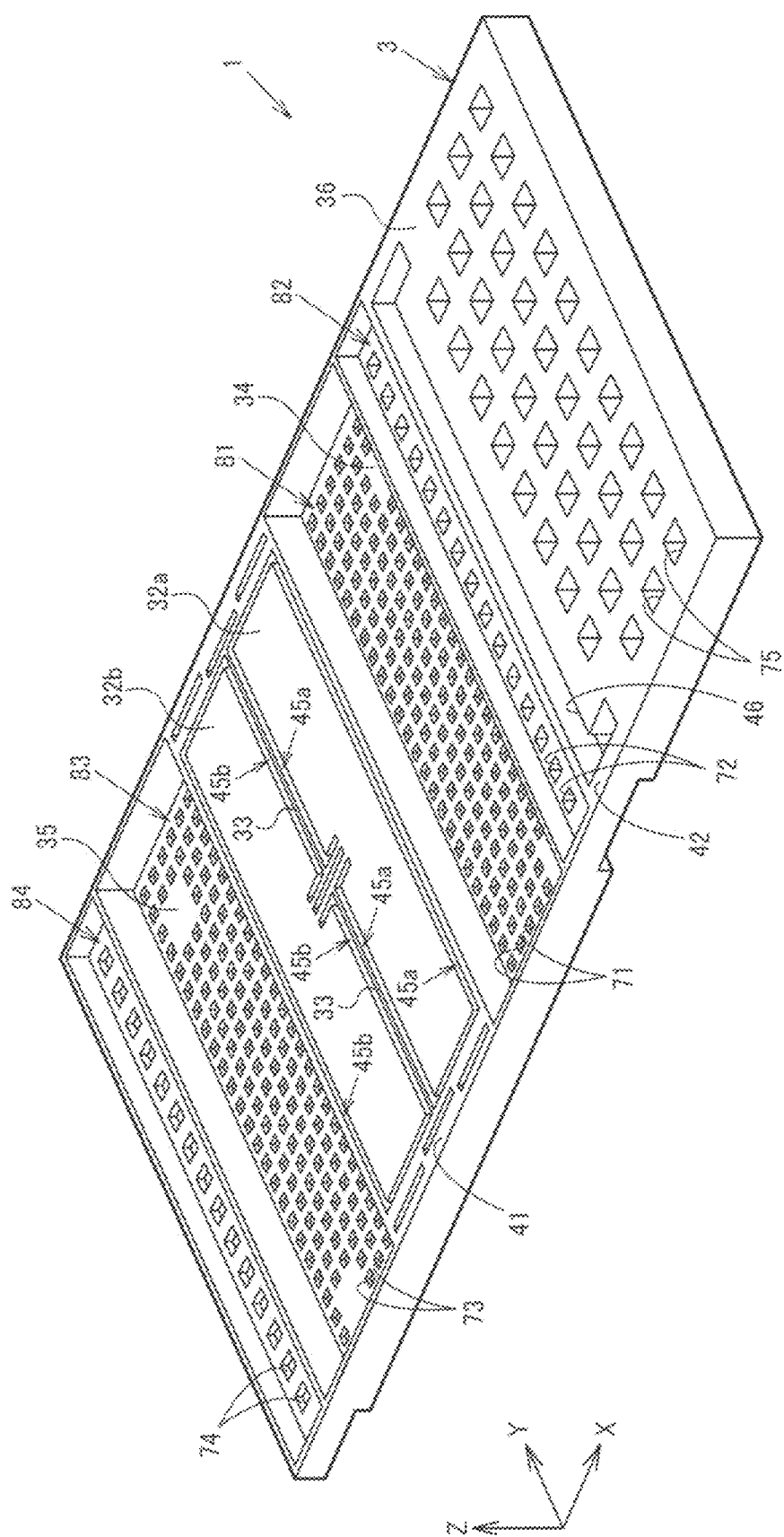
FIG. 4 is a perspective view of the physical quantity sensor of the first embodiment.

First, a physical quantity sensor 1 of a first embodiment will be described with reference to FIGS. 1, 2, 3, and 4 by exemplifying an acceleration sensor that detects acceleration in a vertical direction. FIG. 1 is a plan view of the physical quantity sensor 1 of the first embodiment. FIG. 2 is a sectional view taken along the line II-II in FIG. 1, and FIG. 3 is a sectional view taken along the line III-III in FIG. 1. FIG. 4 is a perspective view of the physical quantity sensor 1. The physical quantity sensor 1 is a micro electro mechanical systems (MEMS) device, for example, an inertial sensor.

In FIGS. 1 and 4, for convenience of describing an internal configuration of the physical quantity sensor 1, a substrate 2, a lid 5, and the like illustrated in FIGS. 2 and 3 are not illustrated. In FIGS. 1, 2, and 3, for convenience of description, a dimension of each member, an interval between members, and the like are schematically illustrated, which are different from those in the perspective view of FIG. 4. For example, a thickness, a gap distance, and the like of the movable body 3 illustrated in FIGS. 2 and 3 are actually very small as illustrated in the perspective view of FIG. 4. In the following description, a case where a physical quantity detected by the physical quantity sensor 1 is acceleration will be mainly described, but the physical quantity is not limited to the acceleration and may be other physical quantities such as angular velocity, velocity, pressure, displacement, and gravity. The physical quantity sensor 1 may be used as a gyro sensor, a pressure sensor, a MEMS switch, or the like. For convenience of description, an X axis, a Y axis, and a Z axis are illustrated in each drawing as three axes orthogonal to each other. A direction along the X axis will be referred to as an "X axis direction", a direction along the Y axis will be referred to as a "Y axis direction", and a direction along the Z axis will be referred to as a "Z axis direction". Here, the X axis direction, the Y axis direction, and the Z axis direction may also be referred to as a first direction, a second direction, and a third direction, respectively. A proximal side of an arrow in each axial direction may also be referred to as a "positive side", a basal side may also be referred to as a "negative side", the positive side in the Z axis direction may also be referred to as "up", and the negative side in the Z axis direction may also be referred to as "down". The Z axis direction is along a vertical direction, and the XY plane is along a horizontal plane. The term "orthogonal" includes not only intersection at 90° but also intersection at an angle slightly inclined from 90°.

The physical quantity sensor 1 illustrated in FIGS. 1 to 4 detects an acceleration in the Z axis direction that is the vertical direction. The physical quantity sensor 1 has a substrate 2, a movable body 3 provided to face the substrate 2, and a lid 5 that is bonded to the substrate 2 and covers the movable body 3. The movable body 3 may also be called a swing structure or a sensor element.

As illustrated in FIG. 1, the substrate 2 has a width in the X axis direction and the Y axis direction, and has a thickness is in the Z axis direction. As illustrated in FIGS. 2 and 3, the substrate 2 is formed with a recess 21 and a recess 21a that are recessed on a lower surface side and have different depths. The depth of the recess 21a from an upper surface is larger than that of the recess 21. The recess 21 and the recess 21a include the movable body 3 inside in a plan view from the Z axis direction, and are formed larger than the movable body 3. The recess 21 and the recess 21a function as a relief for suppressing contact between the movable body 3 and the substrate 2. On the substrate 2, a first fixed electrode 24 and a second fixed electrode 25 are disposed on a bottom surface of the recess 21, and a dummy electrode 26a is disposed on a bottom surface of the recess 21a. The first fixed electrode 24 and the second fixed electrode 25 may also be referred to as a first detection electrode and a second detection electrode, respectively. Dummy electrodes 26b and 26c are also disposed on the bottom surface of the recess 21. The first fixed electrode 24 and the second fixed electrode 25 are respectively coupled to QV amplifiers (not illustrated), and a capacitance difference thereof is detected as an electric signal according to a differential detection method. Therefore, it is desirable that the first fixed electrode 24 and the second fixed electrode 25 have the same area. The movable body 3 is bonded to upper surfaces of mounts 22a and 22b of the substrate 2. Consequently, the movable body 3 can be fixed to the substrate 2 in a state of being separated from the bottom surface of the recess 21 of the substrate 2.

As the substrate 2, a glass material containing, for example, alkali metal ions, for example, a glass substrate made of borosilicate glass such as Pyrex (registered trademark) or Tempax (registered trademark) glass may be used. However, a constituent material of the substrate 2 is not particularly limited, and for example, a silicon substrate, a quartz substrate, or a silicon on insulator (SOI) substrate may be used.

As illustrated in FIGS. 2 and 3, the lid 5 is provided with a recess 51 recessed on the upper surface side. The lid 5 stores the movable body 3 in the recess 51 and is bonded to the upper surface of the substrate 2. A storage space SA storing the movable body 3 is formed inside the lid 5 and the substrate 2. The storage space SA is an airtight space, and is preferably filled with an inert gas such as nitrogen, helium, or argon, and an operating temperature is about −40° C. to 125° C. at the substantially atmospheric pressure. However, the atmosphere of the storage space SA is not particularly limited, and may be in a reduced pressure state or a pressurized state, for example.

As the lid 5, for example, a silicon substrate may be used. However, the present disclosure is not particularly limited, and, for example, a glass substrate or a quartz substrate may be used as the lid 5. As a method of bonding the substrate 2 and the lid 5 to each other, for example, anode bonding or activation bonding may be used, but the present disclosure is not particularly limited, and the substrate 2 and the lid 5 may be appropriately selected depending on a material.

The movable body 3 may be formed by etching, for example, a conductive silicon substrate doped with impurities such as phosphorus (P), boron (B) or arsenic (As), particularly by vertically processing the silicon substrate according to the Bosch process that is a depth etching technique.

The movable body 3 is swingable about a rotation axis AY along the Y axis direction. The movable body 3 has fixing portions 32a and 32b, a support beam 33, a first mass portion 34, a second mass portion 35, and a torque generator 36. The torque generator 36 may also be referred to as a third mass portion. The fixing portions 32a and 32b that are H-shaped central anchors are bonded to the upper surfaces of the mounts 22a and 22b of the substrate 2 through anode bonding or the like. The support beam 33 extends in the Y axis direction to form the rotation axis AY, and is used as a torsion spring. That is, when an acceleration az is applied to the physical quantity sensor 1, the movable body 3 swings about the rotation axis AY while twisting and deforming the support beam 33 with the support beam 33 as the rotation axis AY. The rotation axis AY may also be referred to as a swing axis, and rotation of the movable body 3 about the rotation axis AY is swing of the movable body 3 about the swing axis.

The movable body 3 that is a movable electrode has a rectangular shape with the X axis direction as a longitudinal direction in a plan view from the Z axis direction. The first mass portion 34 and the second mass portion 35 of the movable body 3 are disposed to interpose the rotation axis AY therebetween along the Y axis direction in a plan view from the Z axis direction. Specifically, in the movable body 3, the first mass portion 34 and the second mass portion 35 are coupled via a first connector 41, and first openings 45a and 45b are provided between the first mass portion 34 and the second mass portion 35. The fixing portions 32a and 32b and the support beam 33 are disposed in the first openings 45a and 45b. The fixing portions 32a and 32b and the support beam 33 are disposed inside the movable body 3 as described above, and thus the movable body 3 can be miniaturized. The torque generator 36 is coupled to the first mass portion 34 at both ends in the Y axis direction via the second connector 42. A second opening 46 is provided between the first mass portion 34 and the torque generator 36 in order to equalize the area of the first mass portion 34 and the area of the second mass portion 35. The first mass portion 34 and the torque generator 36 are located on the positive side in the X axis direction with respect to the rotation axis AY, and the second mass portion 35 is located on the negative side in the X axis direction with respect to the rotation axis AY. The first mass portion 34 and the torque generator 36 are longer in the X axis direction than the second mass portion 35, and have the larger rotational moment about the rotation axis AY when the acceleration az in the Z axis direction is applied than that of the second mass portion 35.

Due to this difference in rotational moment, the movable body 3 see-saws about the rotation axis AY when the acceleration az in the Z axis direction is applied. The see-sawing refers to that, when the first mass portion 34 is displaced to the positive side in the Z axis direction, the second mass portion 35 is displaced to the negative side in the Z axis direction, and, conversely, when the first mass portion 34 is displaced to the negative side in the Z axis direction, the second mass portion 35 is displaced to the positive side in the Z axis direction.

In the movable body 3, the first connector 41 disposed in the Y axis direction and the fixing portions 32a and 32b are coupled to each other via the support beam 33 extending in the Y axis direction. Thus, the movable body 3 can be displaced about the rotation axis AY in a see-sawing manner with the support beam 33 as the rotation axis AY.

The movable body 3 has a plurality of through-holes in the entire region thereof. The damping of air at the time of see-sawing of the movable body 3 is reduced by the through-holes, and thus the physical quantity sensor 1 can be appropriately operated in a wider frequency range.

Next, the first fixed electrode 24 and the second fixed electrode 25 disposed on the bottom surface of the recess 21 of the substrate 2 and the dummy electrodes 26a, 26b, and 26c will be described.

As illustrated in FIG. 1, in a plan view from the Z axis direction, the first fixed electrode 24 is disposed to overlap the first mass portion 34, and the second fixed electrode 25 is disposed to overlap the second mass portion 35. The first fixed electrode 24 and the second fixed electrode 25 are provided substantially symmetric with respect to the rotation axis AY in a plan view from the Z axis direction such that capacitances Ca and Cb illustrated in FIG. 2 are the same as each other in a natural state in which the acceleration az in the Z axis direction is not applied.

The first fixed electrode 24 and the second fixed electrode 25 are electrically coupled to differential type QV amplifiers (not illustrated). When the physical quantity sensor 1 is driven, a drive signal is applied to the movable body 3. A capacitance Ca is formed between the first mass portion 34 and the first fixed electrode 24, and a capacitance Cb is formed between the second mass portion 35 and the second fixed electrode 25. In the natural state where the acceleration az in the Z axis direction is not applied, the capacitances Ca and Cb are almost equal to each other.

When the acceleration az is applied to the physical quantity sensor 1, the movable body 3 see-saws about the rotation axis AY. Due to the see-sawing of the movable body 3, a separation distance between the first mass portion 34 and the first fixed electrode 24 and a separation distance between the second mass portion 35 and the second fixed electrode 25 change in opposite phases, and thus the capacitances Ca and Cb change in opposite phases to each other. Consequently, the physical quantity sensor 1 can detect the acceleration az based on a difference between the capacitance values of the capacitances Ca and Cb.

In order to prevent charge drift due to exposure of the substrate surface or sticking at the time of anode bonding after forming the movable body, the dummy electrodes 26a, 26b, and 26c are provided on glass exposed surfaces of the substrate 2 other than the first fixed electrode 24 and the second fixed electrode 25. The dummy electrode 26a is located on the positive side in the X axis direction with respect to the first fixed electrode 24, and is provided below the torque generator 36 to overlap the torque generator 36 in a plan view from the Z axis direction. The dummy electrode 26b is provided below the support beam 33, and the dummy electrode 26c is provided below the left lower side of the second mass portion 35. These dummy electrodes 26a, 26b, and 26c are electrically coupled to each other via a wiring (not illustrated). Consequently, the dummy electrodes 26a, 26b, and 26c are set to the same potential. The dummy electrode 26b below the support beam 33 is electrically coupled to the movable body 3 that is a movable electrode. For example, a protrusion (not illustrated) is provided on the substrate 2, an electrode extending from the dummy electrode 26b is formed to cover the top of the protrusion, and the electrode comes into contact with the movable body 3 such that the dummy electrode 26b is electrically coupled to the movable body 3. Consequently, the dummy electrodes 26a, 26b, and 26c are set to have the same potential as that of the movable body 3 that is a movable electrode.

As illustrated in FIG. 3, the physical quantity sensor 1 is provided with stoppers 11 and 12 that restrict rotation of the movable body 3 about the rotation axis AY. In FIG. 3, the stoppers 11 and 12 are implemented by protrusions provided on the substrate 2. When the movable body 3 excessively see-saws, the stoppers 11 and 12 restrict the further see-sawing of the movable body 3 by contacting the tops of the stoppers 11 and 12 with the movable body 3. Such stoppers 11 and 12 are provided, and thus it is possible to prevent the movable body 3 and the first fixed electrode 24 and the second fixed electrode 25 having different potentials from being excessively close to each other. Generally, an electrostatic attraction is generated between electrodes having different potentials. Therefore, when excessive proximity occurs, "sticking" occurs in which the movable body 3 is attracted to the first fixed electrode 24 and the second fixed electrode 25 and cannot return due to the electrostatic attraction generated between the movable body 3 and the first fixed electrode 24 and the second fixed electrode 25. In such a state, the physical quantity sensor 1 does not operate normally. Therefore, it is important to provide stoppers 11 and 12 to prevent excessive proximity.

Since the movable body 3 and the first fixed electrode 24 and the second fixed electrode 25 have different potentials, as illustrated in FIG. 3, electrodes 27a and 27c as protective films are formed on the tops of the stoppers 11 and 12 to cover the tops in order to prevent a short circuit. Specifically, as illustrated in FIGS. 1 and 3, the electrode 27a is pulled out from the dummy electrode 26a on the negative side in the X axis direction, and the tip of the pulled out electrode 27a is provided to cover the top of the stopper 11. The electrode 27c is pulled out from the dummy electrode 26c on the positive side in the X axis direction, and the tip of the pulled out electrode 27c is provided to cover the top of the stopper 12. Since the dummy electrodes 26a and 26c are set to have the same potential as that of the movable body 3, a short circuit is prevented even when the movable body 3 comes into contact with the stoppers 11 and 12.

A modification may occur, such as providing an insulating layer such as silicon oxide or silicon nitride for preventing short circuits on the tops of the stoppers 11 and 12 or providing electrodes having different potentials. In FIG. 3, the stoppers 11 and 12 are provided on the substrate 2, but a modification may occur, such as providing the stoppers 11 and 12 for restricting the rotation of the movable body 3 about the rotation axis AY on the movable body 3 or on the lid 5.

As described above, the physical quantity sensor 1 of the present embodiment includes the substrate 2 provided with the first fixed electrode 24 orthogonal to the Z axis when the three axes orthogonal to each other are the X axis, the Y axis, and the Z axis, and the movable body 3 that includes the first mass portion 34 facing the first fixed electrode 24 in the Z axis direction and is provided to be swingable with respect to the substrate 2 about the rotation axis AY along the Y axis.

In the present embodiment, as illustrated in FIGS. 2 and 3, the first mass portion 34 includes a first region 61 and a second region 62 that is farther from the rotation axis AY than the first region 61. That is, a plurality of regions are set in the first mass portion 34, and, among these plurality of regions, a region closer to the rotation axis AY is set as the first region 61, and a region farther from the rotation axis AY than the first region 61 is set as the second region 62. A first through-hole group 71 is provided in the first region 61, and a second through-hole group 72 is provided in the second region 62. In the first region 61, for example, a plurality of square shape through-holes are provided as the first through-hole group 71, and, in the second region 62, for example, a plurality of square shape through-holes are provided as the second through-hole group 72. As will be described later, an opening shape of the through-hole is not limited to a square shape, and may be a polygonal shape other than a square shape or a circular shape. The movable body 3 includes a first surface 6 that is a surface on the substrate 2 side and a second surface 7 that is a surface on the rear side with respect to the first surface 6. For example, when the positive side in the Z axis direction is upward and the negative side in the Z axis direction is downward, the first surface 6 is a lower surface of the movable body 3, and the second surface 7 is an upper surface of the movable body 3.

As illustrated in FIGS. 2 and 3, a step 8 is provided at the first surface 6 of the first mass portion 34. Specifically, the first surface 6 that is the lower surface of the first mass portion 34 is provided with the step 8 for making a first gap distance h1 smaller than a second gap distance h2. Here, the first gap distance h1 is a gap distance in the Z axis direction of a first gap Q1 that is a gap between the first mass portion 34 and the first fixed electrode 24 in the first region 61, and is a separation distance between the first mass portion 34 and the first fixed electrode 24 in the first gap Q1. The second gap distance h2 is a gap distance in the Z axis direction of a second gap Q2 that is a gap between the first mass portion 34 and the first fixed electrode 24 in the second region 62, and is a separation distance between the first mass portion 34 and the first fixed electrode 24 in the second gap Q2. That is, the first mass portion 34 faces the first fixed electrode 24 provided on the substrate 2, but the step 8 is provided at the first surface 6 that is the surface of the first mass portion 34 on the substrate 2 side such that the first gap distance h1 in the first region 61 is smaller than the second gap distance h2 in the second region 62. The step 8 is provided, and thus the first surface 6 in the second region 62 is located further toward the positive side in the Z axis direction than the first surface 6 in the first region 61. Consequently, the second gap distance h2 that is a distance between the first surface 6 and the first fixed electrode 24 in the second region 62 is larger than the first gap distance h1 that is a distance between the first surface 6 and the first fixed electrode 24 in the first region 61. The first gap distance h1 is reduced as described above, and thus it is possible to narrow a gap in the first region 61 that is a region closer to the rotation axis AY among the plurality of regions of the first mass portion 34. Therefore, it is possible to realize high sensitivity of the physical quantity sensor 1.

In the present embodiment, the depth of the through-hole of the first through-hole group 71 and the second through-hole group 72 in the Z axis direction is smaller than the maximum thickness of the movable body 3 in the Z axis direction. Since the depth of the through-hole of the first through-hole group 71 and the second through-hole group 72 is reduced as described above, it is possible to reduce the hole damping in the through-hole and thus to realize low damping of the physical quantity sensor 1. Therefore, according to the present embodiment, it is possible to provide the physical quantity sensor 1 that can realize both higher sensitivity and lower damping.

Here, the through-holes of the first through-hole group 71 are through-holes forming the first through-hole group 71, and the through-holes of the second through-hole group 72 are through-holes configuring the second through-hole group 72. The depth of the through-hole in the Z axis direction is a length of the through-hole in the Z axis direction, and may also be said to be a thickness of the through-hole. The maximum thickness of the movable body 3 is a thickness of the movable body 3 at a location where the thickness of the movable body 3 in the Z axis direction is the largest. For example, when a silicon substrate is patterned through etching or the like to form the movable body 3, the maximum thickness of the movable body 3 may be said to be, for example, a thickness of the silicon substrate before being patterned.

Specifically, as illustrated in FIGS. 1 to 4, the movable body 3 includes the fixing portions 32a and 32b fixed to the substrate 2, and the support beam 33 that couples the fixing portions 32a and 32b to the first mass portion 34 and serves as the rotation axis AY. For example, the fixing portions 32a and 32b of the movable body 3 are bonded to the mounts 22a and 22b of the substrate 2 according to anode bonding or the like, and thus the fixing portions 32a and 32b of the movable body 3 are fixed to the substrate 2. One end of the support beam 33 is coupled to the first mass portion 34 via the first connector 41, the other end of the support beam 33 is coupled to the fixing portions 32a and 32b, and thus the support beam 33 couples the fixing portions 32a and 32b to the first mass portion 34. The fixing portions 32a and 32b are coupled to the mounts 22a and 22b of the substrate 2, and thus the movable body 3 swings about the rotation axis AY with the support beam 33 that is a torsion spring as the rotation axis AY.

In this case, the maximum thickness of the movable body 3 is, for example, a thickness of at least one of the fixing portions 32a and 32b and the support beam 33 in the Z axis direction. For example, the maximum thickness of the movable body 3 is a thickness of the fixing portions 32a and 32b in the Z axis direction, or a thickness of the support beam 33 in the Z axis direction. Alternatively, when the thicknesses of the fixing portions 32a and 32b and the support beam 33 are the same as each other, the maximum thickness of the movable body 3 is the thickness of the fixing portions 32a and 32b and the support beam 33 in the Z axis direction. In the above-described way, the depth of the through-hole of the first through-hole group 71 and the second through-hole group 72 in the Z axis direction can be made smaller than the thickness of at least one of the fixing portions 32a and 32b and the support beam 33 in the Z axis direction. Consequently, hole damping in the through-hole can be reduced, and thus the physical quantity sensor 1 can be appropriately operated in a wider frequency range.

In the physical quantity sensor 1 of the present embodiment, the movable body 3 includes the second mass portion 35 provided with the rotation axis AY interposed between the first mass portion 34 and the second mass portion 35 in a plan view from the Z axis direction. For example, the first mass portion 34 is disposed at the positive side in the X axis direction from the rotation axis AY, and the second mass portion 35 is disposed at the negative side in the X axis direction from the rotation axis AY. The first mass portion 34 and second mass portion 35 are symmetrically disposed with the rotation axis AY as an axis of symmetry, for example. The substrate 2 is provided with the second fixed electrode 25 facing the second mass portion 35.

As illustrated in FIGS. 2 and 3, the second mass portion 35 includes a third region 63 and a fourth region 64 that is farther from the rotation axis AY than the third region 63. That is, the second mass portion 35 is set from a plurality of regions, and, among these plurality of regions, a region closer to the rotation axis AY is set as the third region 63, and a region farther from the rotation axis AY than the third region 63 is set as the fourth region 64. A third through-hole group 73 is provided in the third region 63, and a fourth through-hole group 74 is provided in the fourth region 64.

As illustrated in FIGS. 2 and 3, a step 9 for making a third gap distance h3 smaller than a fourth gap distance h4 is provided at the first surface 6 that is the lower surface of the second mass portion 35. Here, the third gap distance h3 is a gap distance in the Z axis direction of a third gap Q3 that is a gap between the second mass portion 35 and the second fixed electrode 25 in the third region 63, and is a separation distance between the second mass portion 35 and the second fixed electrode 25 in the third gap Q3. The fourth gap distance h4 is a gap distance in the Z axis direction of a fourth gap Q4 that is a gap between the second mass portion 35 and the second fixed electrode 25 in the fourth region 64, and is a separation distance between the second mass portion 35 and the second fixed electrode 25 in the fourth gap Q4. That is, the second mass portion 35 faces the second fixed electrode 25 provided on the substrate 2, but the step 9 is provided at the first surface 6 that is the surface of the second mass portion 35 on the substrate 2 side such that the third gap distance h3 in the third region 63 is smaller than the fourth gap distance h4 in the fourth region 64. The third gap distance h3 is reduced as described above, and thus it is possible to narrow a gap in the third region 63 that is a region closer to the rotation axis AY among the plurality of regions of the second mass portion 35. Therefore, it is possible to realize high sensitivity of the physical quantity sensor 1.

In the present embodiment, the depth of the through-hole of the third through-hole group 73 and the fourth through-hole group 74 in the Z axis direction is smaller than the maximum thickness of the movable body 3 in the Z axis direction. Since the depth of the through-hole of the third through-hole group 73 and the fourth through-hole group 74 is reduced as described above, it is possible to reduce the hole damping in the through-holes of the through-holes and thus to realize low damping of the physical quantity sensor 1.

As described above, in the physical quantity sensor 1 of the present embodiment, a plurality of gaps between electrodes are formed by providing the steps 8 and 9 at the first surface 6 corresponding to the lower surface side of the movable body 3, and it is possible to realize both high sensitivity and low damping by reducing the depth of the through-hole of the movable body 3. That is, since the step 8 is provided at the first surface 6 of the first mass portion 34, the first gap Q1 and the second gap Q2 having different gap distances are formed between the first mass portion 34 and the first fixed electrode 24, and thus two different gaps between electrodes are formed. Similarly, since the step 9 is provided at the first surface 6 of the second mass portion 35, the third gap Q3 and the fourth gap Q4 having different gap distances are formed between the second mass portion 35 and the second fixed electrode 25, and two different gaps between electrodes are formed.

Here, the reason why the first gap distance h1 and the third gap distance h3 in the first region 61 and the third region 63 close to the rotation axis AY are reduced is that, compared with the second region 62 and the fourth region 64 far from the rotation axis AY, the gap can be made narrower by using the fact that displacement in the Z axis direction is small and contact hardly occurs when the movable body 3 swings, so that the capacitance can be increased, and thus it is possible to realize high sensitivity. That is, the displacement in the Z axis direction when the movable body 3 swings is proportional to a distance from the rotation axis AY. Thus, in the first region 61 and the third region 63 close to the rotation axis AY, the displacement in the Z axis direction with respect to the first gap distance h1 and the third gap distance h3 is small, and thus it is difficult to come into contact with the first fixed electrode 24 and the second fixed electrode 25. Therefore, the first gap Q1 between the first surface 6 in the first region 61 and the first fixed electrode 24 and the third gap Q3 between the first surface 6 in the third region 63 and the second fixed electrode 25 can be narrowed. Since the gap between the first gap Q1 or the third gap Q3 is narrowed as described above, the capacitance can be increased, and the sensitivity of the physical quantity sensor 1 is increased as the capacitance is increased, and thus high sensitivity can be realized. On the other hand, since the second gap distance h2 and the fourth gap distance h4 in the second region 62 and the fourth region 64 far from the rotation axis AY are increased, it is possible to suppress contact with the first fixed electrode 24 and the second fixed electrode 25 in the second region 62 and the fourth region 64 and thus to expand a movable range of the movable body 3.

In the present embodiment, the movable body 3 includes the torque generator 36 generating a rotational torque about the rotation axis AY, and the torque generator 36 is provided with a fifth through-hole group 75. For example, the torque generator 36 that is a third mass portion is provided on the positive side in the X axis direction of the first mass portion 34. A fifth gap distance h5 in the Z axis direction of a fifth gap Q5 that is a gap between the torque generator 36 and the substrate 2 is larger than the first gap distance h1 and the second gap distance h2. The fifth gap distance h5 is larger than the third gap distance h3 and the fourth gap distance h4. For example, in FIGS. 2 and 3, the substrate 2 is dug deeply, and thus a recess 21a having a height lower than that of the recess 21 in the Z axis direction is formed, so that the fifth gap distance h5 of the fifth gap Q5 between the torque generator 36 and the substrate 2 is expanded. Consequently, it is possible to reduce damping, prevent sticking due to contact with the dummy electrode 26a, and expand a movable range of the movable body 3. The thickness of the torque generator 36 may be larger than the thickness of the fixing portions 32a and 32b or the support beam 33. In the above-described way, it bs possible to generate a larger torque for rotating the movable body 3 and thus to realize higher sensitivity.

As described above, in the present embodiment, high sensitivity is realized by providing the steps 8 and 9 at the first surface 6 of the movable body 3, and low damping is realized by reducing the depth of the through-hole of the first through-hole group 71 to the fourth through-hole group 74.

For example, in JP-A-2013-040856 described above, a plurality of gaps having different gap distances are formed by providing a step at the substrate side, but, since electrodes and wirings are provided on the step of the substrate, there is a problem in that disconnection or a short circuit is likely to occur as a process risk. In this regard, in the present embodiment, the steps 8 and 9 are provided on the movable body 3 side to form a plurality of gaps having different gap distances, and thus the occurrence problems such as disconnection and a short circuit can be suppressed.

In JP-A-2013-040856, since the thickness of the movable body is uniform and the depth of the through-hole is uniform, there is a problem in that the hole damping that is proportional to the depth of the through-hole tends to increase. When the uniform depth of the through-hole is reduced to reduce the damping, the rigidity of the movable body is lowered, and thus there is a problem in that the impact resistance is deteriorated and the risk of breakage is increased. In this respect, in the present embodiment, the depth of the through-hole of the first through-hole group 71, the second through-hole group 72, and the like is smaller than the maximum thickness of the movable body 3 while maintaining the maximum thickness of the movable body 3. For example, in FIGS. 2 and 3, the depth of the through-hole in the first region 61, the second region 62, and the like is sufficiently smaller than the maximum thickness while maintaining the maximum thickness of the movable body 3 that is the thickness of the fixing portions 32a and 32b or the support beam 33. Since the hole damping can be reduced by reducing the depth of the through-hole as described above, it is possible to realize low damping and thus an operation in a wider frequency range becomes possible. Since the maximum thickness of the movable body 3 is secured, the physical quantity sensor 1 having good impact resistance can be implemented. That is, low damping can be realized while maintaining the rigidity of the movable body 3.

In JP-T-2008-529001 described above, the step is provided at the surface of the movable body on the substrate side, but, since a through-hole is not provided in the first place, there is a problem in that damping is very large and a desired frequency bandwidth cannot be secured. Even when a through-hole is provided, it is difficult to uniformly reduce a thickness from the viewpoint of ensuring the rigidity, and thus hole damping in the through-hole cannot be reduced. In contrast, in the present embodiment, the steps 8 and 9 and the like are provided at the first surface 6 of the movable body 3 to improve the sensitivity, and the through-hole is provided in the movable body 3, and the depth of the through-hole is made smaller than the maximum thickness of the movable body 3. In the above-described way, it is possible to ensure the rigidity of the movable body 3 and also to reduce the damping.

In US-A-2017/0341927 described above, the section of the movable body in the mass portion is formed into a recess shape to reduce a thickness, and the movable body is configured to be interposed between the upper and lower fixed electrodes. However, since a gap distance of a gap between the electrodes is constant, there is a problem in that it is difficult to increase the sensitivity. Since an optimum dimensional condition for a through-hole is not disclosed, it cannot necessarily be said that an optimum dimension of a through-hole is for low damping. In contrast, in the present embodiment, by providing the steps 8, 9 and the like at the first surface 6 of the movable body 3, the first gap distance h1 can be made smaller than the second gap distance h2, or the third gap distance h3 can be made smaller than the fourth gap distance h4, and the gap distances between the electrodes are different. In the above-described way, since the steps 8, 9 and the like are provided to reduce the first gap distance h1 and the third gap distance h3, the gaps can be narrowed in the first region 61 of the first mass portion 34 and the third region 63 of the second mass portion 35 and the capacitance can be increased such that high sensitivity can be realized. Since the depth of the through-hole is made smaller than the maximum thickness of the movable body 3, it is possible to realize both high sensitivity and low damping, and, as will be described later, an opening area of the through-hole in each region is optimized such that it is possible to realize lower damping.

In US-A-2017/0341927, since the rigidity around the support beam that is a torsion spring is not high, there is concern that a problem such as breakage of the support beam may occur. In contrast, in the present embodiment, fixing portions 32a and 32b disposed at both sides of the support beam are provided along the width direction of the movable body 3 in the Y axis direction. The fixing portion 32a is a first fixing portion, and the fixing portion 32b is a second fixing portion. The fixing portions 32a and 32b are fixed to the mounts 22a and 22b of the substrate 2. For example, a width of the movable body 3 in the Y axis direction is indicated by WM. In this case, the fixing portions 32a and 32b are provided on both sides of the support beam 33 such that a width WF in the Y axis direction that is a long side direction of the fixing portions 32a and 32b is larger than, for example, WM/2. Since the fixing portions 32a and 32b are provided on both sides of the support beam 33 over a wide distance as described above, even when the physical quantity sensor 1 receives an impact, breakage of the support beam 33 due to the impact can be suppressed. For example, in a location immediately near the rotation axis AY, almost no displacement occurs when acceleration is applied, and thus even when an electrode is formed in the location immediately near the rotation axis AY, the location does not contribute much to the sensitivity. Therefore, in the present embodiment, the fixing portions 32a and 32b are provided in the location immediately near the rotation axis AY, which does not contribute to the sensitivity, to prevent the support beam 33 from being broken, and thus it is possible to effectively utilize the dead space.

As illustrated in FIGS. 1 to 4, an opening area of the through-hole of the second through-hole group 72 is larger than an opening area of the through-hole of the first through-hole group 71. Similarly, an opening area of the through-hole of the fourth through-hole group 74 is larger than an opening area of the through-hole of the third through-hole group 73. The opening area of the through-hole of the first through-hole group 71 is the same as the opening area of the through-hole of the third through-hole group 73, and the opening area of the through-hole of the second through-hole group 72 is the same as the opening area of the through-hole of the fourth through-hole group 74. Here, the opening area of the through-hole of the through-hole group is an opening area of one through-hole forming the through-hole group. As described above, since the opening area of the through-hole of the second through-hole group 72 or the fourth through-hole group 74 far from the rotation axis AY is larger than the opening area of the through-hole of the first through-hole group 71 or the third through-hole group 73 close to the rotation axis AY, it is possible to satisfy a dimensional condition for the through-hole that can realize low damping of the movable body 3 and thus to realize low damping of the physical quantity sensor 1.

The opening area of the through-hole of the fifth through-hole group 75 provided in the region of the torque generator 36 is larger than the opening area of the through-hole of the first through-hole group 71 and the second through-hole group 72. Similarly, the opening area of the through-hole of the fifth through-hole group 75 is larger than the opening area of the through-hole of the third through-hole group 73 and the fourth through-hole group 74. As described above, since the opening area of the through-hole in the torque generator 36 that is farther from the rotation axis AY than the first mass portion 34 and the second mass portion 35 is increased, it is possible to satisfy a dimensional condition for the through-hole that can realize low damping of the movable body 3 and thus to realize lower damping of the physical quantity sensor 1.

For a dimension of the through-hole, a value near a minimum damping condition determined by parameters of a gap distance, a depth of the through-hole, and a ratio of a dimension of the through-hole/a distance between the hole ends may be employed. Specifically, square shape through-holes having different sizes are provided in the respective regions. For example, the opening area of the through-hole in the first region 61 or the third region 63 near the rotation axis AY is 5 µm×5 µm as an example. The opening area of the through-hole in the second region 62 or the fourth region 64 that is far from the rotation axis AY is about 8 µm×8 µm as an example. The opening area of the through-hole in the torque generator 36 farther from the rotation axis AY is about 20 µm×20 µm as an example.

The depth of the through-hole of the first through-hole group 71 and the second through-hole group 72 is less than 50% of the maximum thickness of the movable body 3 in the Z axis direction. For example, the depth of the through-hole is less than 50% of the thickness of the fixing portions 32a and 32b or the support beam 33, which the maximum thickness of the movable body 3. Similarly, the depth of the through-hole of the third through-hole group 73 and the fourth through-hole group 74 is less than 50% of the maximum thickness of the movable body 3 in the Z axis direction. As described above, since the depth of the through-hole is made less than half of the maximum thickness of the movable body, hole damping in the through-hole can be sufficiently reduced compared with a case where the depth of the through-hole is equal to the maximum thickness of the movable body 3, and thus it is possible to realize low damping. More preferably, the depth of the through-hole of the first through-hole group 71, the second through-hole group 72, and the like is less than 17% of the maximum thickness of the movable body 3. Consequently, it is possible to realize lower damping.

As illustrated in FIGS. 1 to 4, in the present embodiment, a first recess 81 of which the first through-hole group 71 is disposed in the bottom surface is provided at the second surface 7 of the movable body 3 in the first region 61. That is, the second surface 7 that is the surface of the first mass portion 34 on the lid 5 side is provided with the first recess 81 recessed on the negative side in the Z axis direction in the first region 61. As illustrated in FIG. 4, in the first recess 81, a plurality of walls, for example, four walls are provided to surround the disposition region of the first through-hole group 71, and the rigidity in the first region 61 is ensured by the walls. That is, as described above, the depth of the first through-hole group 71 is smaller than the maximum thickness of the movable body 3 in order to reduce the damping. Thus, the thickness of the movable body 3 in the disposition region of the first through-hole group 71 is small, and thus the rigidity is reduced, so that there is concern that the risk of breakage may increase. In this regard, in FIGS. 1 to 4, since the first region 61 is formed into a recess shape, the rigidity of the movable body 3 in the first region 61 is increased by the walls corresponding to an edge of the first recess 81, and thus it is possible to avoid the risk of breakage.

Similarly, a third recess 83 of which the third through-hole group 73 is disposed in the bottom surface is provided at the second surface 7 of the movable body 3 in the third region 63. As illustrated in FIG. 4, a plurality of walls are provided to surround the disposition region of the third through-hole group 73 in the third recess 83, and the rigidity in the third region 63 is ensured by the walls.

As illustrated in FIGS. 1 to 4, a second recess 82 of which the second through-hole group 72 is disposed in the bottom surface is provided at the second surface 7 of the movable body 3 in the second region 62. That is, the second recess 82 recessed on the negative side in the Z axis direction is provided at the second surface 7 that is the surface of the first mass portion 34 on the lid 5 side in the second region 62. As illustrated in FIG. 4, a plurality of walls, for example, four walls are provided to surround the disposition region of the second through-hole group 72 in the second recess 82, and the rigidity in the second region 62 is ensured by the walls. That is, as described above, the depth of the second through-hole group 72 is smaller than the maximum thickness of the movable body 3 in order to reduce the damping. Thus, the thickness of the movable body 3 in the disposition region of the second through-hole group 72 is small, and thus the rigidity is reduced, so that there is concern that the risk of breakage may increase. In this regard, in FIGS. 1 to 4, since the second region 62 is formed into a recess shape, the rigidity of the movable body 3 in the second region 62 is increased by the walls corresponding to an edge of the second recess 82, and thus it is possible to avoid the risk of breakage.

Similarly, a fourth recess 84 of which the fourth through-hole group 74 is disposed in the bottom surface is provided at the second surface 7 of the movable body 3 in the fourth region 64. As illustrated in FIG. 4, a plurality of walls are provided to surround the disposition region of the fourth through-hole group 74 in the fourth recess 84, and the rigidity in the fourth region 64 is ensured by the walls.

The depths of the second recess 82 and the fourth recess 84 are smaller than the depths of the first recess 81 and the third recess 83. In the above-described way, the first gap distance h1 in the first region 61 or the third gap distance h3 in the third region 63 can be made smaller than the second gap distance h2 in the second region 62 or the fourth gap distance h4 in the fourth region 64, and the first recess 81, the second recess 82, the third recess 83, and the fourth recess 84 can also be formed at the second surface 7 of the movable body 3.

In the present embodiment, the thickness of the through-hole that is the depth of the through-hole is reduced by forming the first recess 81 to the fourth recess 84 in the movable body 3, but the thickness of the region between the ends of the through-holes, that is, between the adjacent through-holes is also reduced. Considering that, for example, the lower stoppers 11 and 12 come into contact with the region, it is disadvantageous in terms of strength of a structure. Therefore, it is desirable to increase the thickness of the movable body 3 in the region with the stoppers 11 and 12 in FIG. 3 are in contact. For example, when the stopper 11 is provided in the first region 61 in a plan view in the Z axis direction, the thickness of the movable body 3 is increased in at least a region with which the stopper 11 is in contact in the first region 61. When the stopper 12 is provided in the third region 63 in a plan view in the Z axis direction, the thickness of the movable body 3 is increased in at least in a region with which the stopper 12 is in contact in the third region 63.

In the above description, the case where two regions having the steps between adjacent regions are provided in the first mass portion 34 has been described, but the present embodiment is not limited to this, and three or more regions having steps between adjacent regions may be provided in the first mass portion 34. For example, a step is provided between adjacent regions, a region RA1 to a region RAn are disposed in the order closer to the rotation axis AY, and the region RA1 to the region RAn are provided in the first mass portion 34. Here, n is an integer of 2 or greater. A step is provided in each inter-region at the first surface 6 such that a gap distance between the first mass portion 34 and the first fixed electrode 24 in each region increases from the region RA1 toward the region RAn. In this case, the first region 61 is the region RAi of the regions RA1 to RAn, and the second region 62 is the region RAj of the regions RA1 to RAn. Here, i and j are integers satisfying 1≤i<j≤n, and the region RAj is a region farther from the rotation axis AY than the region RAi. A gap distance from the first fixed electrode 24 in the region RAj is larger than a gap distance in the region RAi.

Similarly, three or more regions having steps between adjacent regions may be provided in the second mass portion 35. For example, a step is provided between adjacent regions, a region RB1 to a region RBn are disposed in the order closer to the rotation axis AY, and the region RB1 to the region RBn are provided in the second mass portion 35. A step is provided in each inter-region at the first surface 6 such that a gap distance between the second mass portion 35 and the second fixed electrode 25 in each region increases from the region RB1 toward the region RBn. In this case, the third region 63 is the region RBi of the regions RB1 to RBn, the fourth region 64 is the region RBj of the regions RB1 to RBn, and the region RBj is a region farther from the rotation axis AY than the region RBi. A gap distance from the second fixed electrode 25 in the region RBj is larger than a gap distance in the region RBi.

Figure 5:
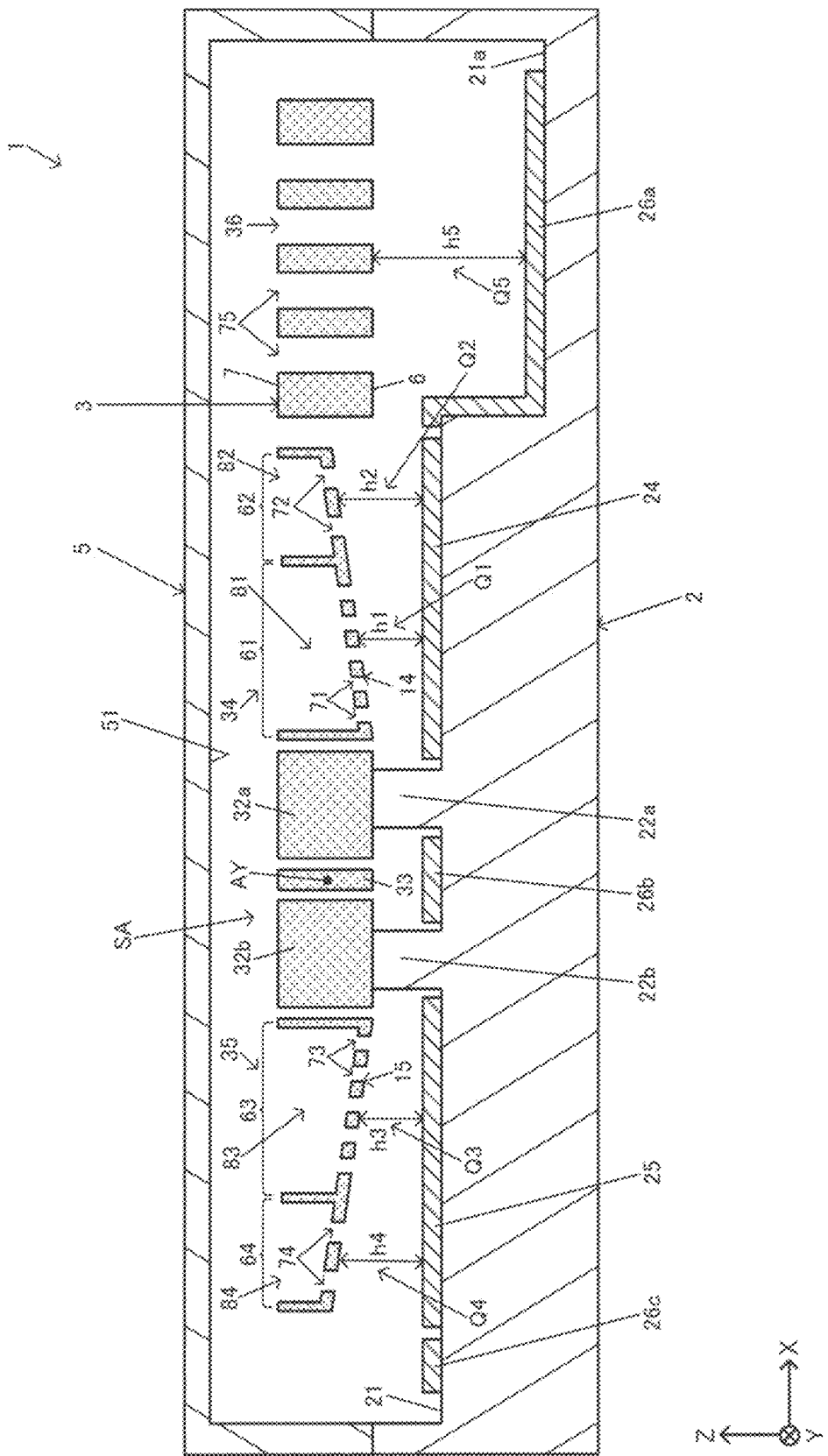
FIG. 5 is a sectional view of the physical quantity sensor when a slope is provided instead of a step.

In the above description, the case where the steps 8 and 9 are provided at the first surface 6 of the first mass portion 34 or the second mass portion 35 in order to change a gap distance has been described, but the present embodiment is not limited to this, and slopes 14 and 15 may be provided as illustrated in FIG. 5. The same applies to each embodiment described later.

Specifically, in FIG. 5, the slope 14 is provided at the first surface 6 of the first mass portion 34 such that the first gap distance h1 of the first gap Q1 in the first region 61 is smaller than the second gap distance h2 of the second gap Q2 in the second region 62. For example, in a sectional view from the Y axis direction illustrated in FIG. 5, the slope 14 inclined, for example, counterclockwise at a predetermined angle with respect to the X axis direction is provided at the first surface 6 that is the lower surface of the first mass portion 34. Similarly, the slope 15 is provided at the first surface 6 of the second mass portion 35 such that the third gap distance h3 of the third gap Q3 in the third region 63 is smaller than the fourth gap distance h4 of the fourth gap Q4 in the fourth region 64. For example, in a sectional view from the Y axis direction illustrated in FIG. 5, the slope 15 inclined, for example, clockwise at a predetermined angle with respect to the X axis direction is provided at the first surface 6 that is the lower surface of the second mass portion 35.

For example, when the steps 8 and 9 are provided as illustrated in FIGS. 2 and 3, the gap distances h1, h2, h3, and h4 are constant in the respective regions such as first region 61, the second region 62, the third region 63, and the fourth region 64. In contrast, when the slopes 14 and 15 are provided as illustrated in FIG. 5, the gap distances h1, h2, h3, and h4 are not constant in the respective regions such as first region 61, the second region 62, the third region 63, and the fourth region 64, and change according to a distance from the rotation axis AY. Specifically, when the slope 14 is provided at the first surface 6 of the first mass portion 34, the first gap distance h1 increases as the distance from the rotation axis AY increases in the first region 61 of the first mass portion 34. The second gap distance h2 increases as the distance from the rotation axis AY increases in the second region 62 of the first mass portion 34. Here, the second gap distance h2 is equal to or more than the maximum distance of the first gap distance h1. Similarly, when the slope 15 is provided at the first surface 6 of the second mass portion 35, the third gap distance h3 increases as the distance from the rotation axis AY increases in the third region 63 of the second mass portion 35. The fourth gap distance h4 increases as the distance from the rotation axis AY increases in the fourth region 64 of the second mass portion 35. Here, the fourth gap distance h4 is equal to or more than the maximum distance of the third gap distance h3. An inclination of the slope 14 may be different between the first region 61 and the second region 62, and an inclination of the slope 15 may also be different between the third region 63 and the fourth region 64.

The slopes 14 and 15 are provided such that the gap distance increases as the distance from the rotation axis AY increases, and thus the same effect as when the steps 8 and 9 are provided can be achieved. That is, since the slopes 14 and 15 are provided, it is possible to narrow the gap in the region close to the rotation axis AY, and the capacitance is increased by narrowing the gap, and thus it is possible to realize high sensitivity of the physical quantity sensor 1. Since the slopes 14 and 15 are provided not on the substrate 2 side but on the movable body 3 side to form a plurality of gaps having different gap distances, it is possible to suppress the occurrence of problems such as disconnection and a short circuit.

Since the slopes 14 and 15 are provided above-described way and the gap distance is gradually changed, it is possible to realize higher sensitivity compared with a case where a step is provided. For example, when the slopes 14 and 15 are provided, an initial gap distance becomes small at a position close to the rotation axis AY, but displacement in the Z axis direction also becomes small. On the other hand, an initial gap distance becomes large at a position far from the rotation axis AY, but displacement in the Z axis direction also becomes large. Therefore, the slopes 14 and 15 are provided, and thus it is possible to make hv/hi that is a ratio of the displacement hv in the Z axis direction to the initial gap distance hi more uniform. Consequently, it is possible to make a change in the gap between the electrodes for a capacitance more uniform at each position from a position near the rotation axis AY to a position far from the rotation axis AY, and thus to realize higher sensitivity.

When the plurality of regions RA1 to RAn or the plurality of regions RB1 to RBn in which a step is provided between adjacent regions are provided as described above, it is possible to achieve the same effect as in the cases of the slopes 14 and 15 by increasing the number of regions.

In FIG. 5, the slopes 14 and 15 are provided at the first surface 6 in the first region 61 to the fourth region 64, and the depth of the through-hole in these regions is made smaller than the maximum thickness of the movable body 3. Specifically, the depth of the through-hole is reduced by providing the first recess 81 to the fourth recess 84 at the second surface 7. In FIG. 5, for example, two recesses are provided in each of the first mass portion 34 and the second mass portion 35, but three or more recesses may be provided. In FIG. 5, the slope is provided at the bottom surface of the recess, but the slope may not be provided at the bottom surface of the recess such that the bottom surface of the recess is parallel to, for example, the X axis direction.

Next, a design of the through-hole will be described in detail. The through-hole is provided to control damping of a gas when the movable body 3 swings. This damping includes hole damping of a gas passing through the through-hole and squeeze film damping between the movable body 3 and the substrate 2.

The larger the through-hole, the easier it is for a gas to pass through the through-hole, and thus the hole damping can be reduced. As an occupancy ratio of the through-hole is increased, a substantially facing area between the movable body 3 and the substrate 2 is reduced, and thus the squeeze film damping can be reduced. However, when the occupancy ratio of the through-hole is increased, a facing area between the movable body 3 and the first fixed electrode 24 and the second fixed electrode 25 is reduced, and the mass of the torque generator 36 is reduced. Thus, sensitivity of detecting acceleration is reduced. On the contrary, as the through-hole is made smaller, that is, the occupancy ratio is lowered, the facing area between the movable body 3 and the first fixed electrode 24 and the second fixed electrode 25 is increased, and the mass of the torque generator 36 is increased. Thus, sensitivity of detecting acceleration is improved, but damping is increased. As described above, since the detection sensitivity and the damping are in a trade-off relationship, it is extremely difficult to achieve both of the two.

Regarding such a problem, in the present embodiment, both high sensitivity and low damping are achieved by devising the design of the through-hole. The detection sensitivity of the physical quantity sensor 1 is proportional to A. $1/h^2$ where h is a gap distance that is the separation distance between the movable body 3 and the first fixed electrode 24 and the second fixed electrode 25, B. a facing area between the movable body 3 and the first fixed electrode 24 and the second fixed electrode 25, C. a spring rigidity of the support beam 33, and D. the mass of the torque generator 36. In the physical quantity sensor 1, first, in a state where damping is ignored, the facing area with the first fixed electrode 24 and the second fixed electrode 25, the gap distance, and the like, which are necessary for obtaining the desired sensitivity, are determined. In other words, an occupancy ratio of the through-hole is determined. Consequently, the capacitances Ca and Cb with the required magnitudes are formed, and thus the physical quantity sensor 1 can obtain sufficient sensitivity.

The occupancy ratio of the plurality of through-holes in the first mass portion 34 and the second mass portion 35 is not particularly limited, but is preferably 75% or more, more preferably 78% or more, and, most preferably 82% or more. Consequently, it becomes easier to achieve both high sensitivity and low damping.

After the occupancy ratio of the through-hole is determined as described above, damping is designed for each region such as the first region 61 and the second region 62. As a new technical idea to minimize damping without changing the sensitivity, in the physical quantity sensor 1, a plurality of through-holes are designed such that a difference between the hole damping and the squeeze film damping is as small as possible, and, preferably, the hole damping and the squeeze film damping are equal to each other. As described above, the damping can be reduced by making the difference between the hole damping and the squeeze film damping as small as possible, and, when the hole damping and the squeeze film damping are equal to each other, the damping is minimized. Consequently, it is possible to effectively reduce damping while maintaining a sufficiently high sensitivity.

Since damping design methods for the respective regions are the same as each other, the damping design for the first region 61 will be described below as a representative, and the damping design for the other regions will not be described.

A length in the Z axis direction of the through-hole disposed in the first region 61 is indicated by H (μm), ½ of a length along the Y axis direction of the first mass portion 34 in the first region 61 is indicated by a (μm), and a length along the X axis direction of the first region 61 of the first mass portion 34 is indicated by L (μm). A length in the Z axis direction that is a gap distance of the first gap Q1 is indicated by h (μm), a length of one side of the through-hole disposed in the first region 61 is indicated by S0 (μm), a distance between ends of the adjacent through-holes is indicated by S1 (μm), and a viscous resistance that is a viscosity coefficient of a gas in the first gap Q1, that is, the gas filled in the storage space SA, is indicated by μ (kg/ms). In this case, when damping generated in the first region 61 is indicated by C, C is represented by the following Equation (1). When an interval between adjacent through-holes in the X axis direction and an interval between adjacent through-holes in the Y axis direction are different, S1 may be an average value thereof.

$$C = 2aL\frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right] \quad (1)$$

The parameters used in the above Equation (1) are represented by the following Equations (2) to (8).

$$H_{eff} = H + \frac{2\pi r_0}{8} \quad (2)$$

$$l = \sqrt{\frac{2h^3 H_{eff}\eta(\beta)}{3\beta^2 r_0^2}} \quad (3)$$

$$\eta(\beta) = 1 + \frac{3r_0^4 K(\beta)}{16Hh^3} \quad (4)$$

$$K(\beta) = 4\beta^2 - \beta^4 - 4\ln\beta - 3 \quad (5)$$

$$\beta = \frac{r_0}{r_c} \quad (6)$$

$$r_c = \frac{S0 + S1}{\sqrt{\pi}} \quad (7)$$

$$r_0 = 0.547 \times S0 \quad (8)$$

Here, the hole damping component included in the above Equation (1) is represented by the following Equation (9), and the squeeze film damping component is represented by the following Equation (10).

$$2aL\frac{8\mu H}{\beta^2 r_0^2}\left[1 - \frac{l}{a}\tanh\left(\frac{a}{l}\right)\right] \quad (9)$$

$$2aL\frac{8\mu H}{\beta^2 r_0^2}\left(\frac{3r_0^4 K(\beta)}{16Hh^3}\right)\left[1 - \frac{l}{a}\tanh\left(\frac{a}{l}\right)\right] \quad (10)$$

Therefore, the damping C is minimized by using the dimensions such as H, h, S0, and S1 at which the above Equation (9) is equal to the above Equation (10), that is, the following Equation (11) is satisfied. That is, the following Equation (11) is a conditional equation that minimizes damping.

$$\frac{3r_0^4 K(\beta)}{16Hh^3} = 1 \quad (11)$$

Here, when the length S0 of one side of the through-hole satisfying the above Equation (11) is indicated by S0min, the interval S1 between adjacent through-holes is indicated by S1min, and a minimum value of the damping C that is the damping C when these S0min and S1min are assigned to the above Equation (1) is indicated by Cmin. Although it depends on the accuracy required for the physical quantity sensor 1, damping can be sufficiently reduced by satisfying the following Equation (12) in the range of S0 and S1 when H and h are constant. That is, when the damping is within the minimum damping value Cmin+50%, the damping can be sufficiently reduced, such that the detection sensitivity within a desired frequency bandwidth can be maintained and the noise can be reduced.

$$C \le 1.5 \times Cmin \quad (12)$$

It is preferable to satisfy the following Equation (13), more preferably to satisfy the following Equation (14), and most preferably to satisfy the following Equation (15). Consequently, the above-described effects can be exhibited more remarkably.

$$C \le 1.4 \times Cmin \quad (13)$$

$$C \le 1.3 \times Cmin \quad (14)$$

$$C \le 1.2 \times Cmin \quad (15)$$

Figure 6:
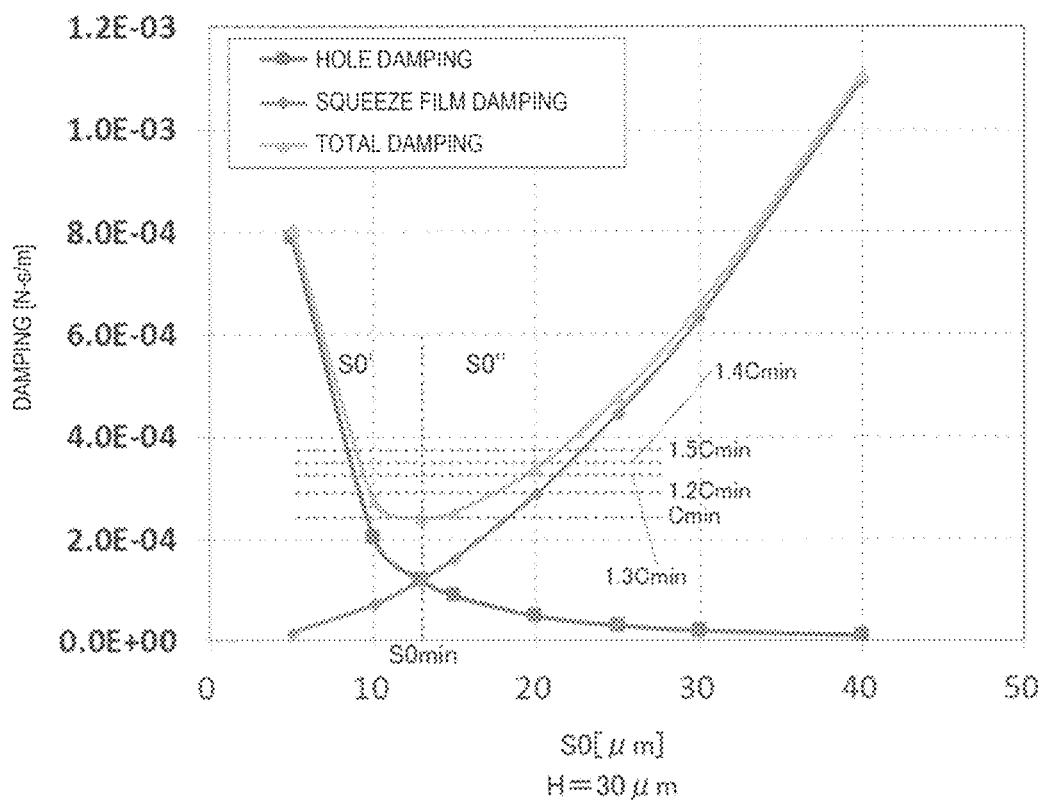
FIG. 6 is a graph illustrating a relationship between a hole size of a through-hole and damping.

FIG. 6 is a graph illustrating a relationship between the length S0 of one side of the through-hole and damping. Here, H=30 um, h=2.3 um, a=217.5 um, and L=785 um. The S1/S0 ratio is set to 1 such that the sensitivity is constant. This indicates that an aperture ratio does not change even when the magnitude of S0 is changed. That is, since the S1/S0 ratio is set to 1, the aperture ratio does not change even when the magnitude of S0 is changed, and the facing area does not change. Therefore, the capacitance to be formed does not change and the sensitivity is maintained. Therefore, there is S0 that minimizes damping while maintaining sensitivity. The aperture ratio may be said to be, for example, a ratio of a total opening area of a plurality of through-holes disposed in a region to an area of the region.

From the graph of FIG. 6, the damping in the above Equation (1) may be separated into the hole damping in the above Equation (9) and the squeeze film damping in the above Equation (10), and it can be seen that the hole damping is dominant in the region where S0 is smaller than S0 min, and the squeeze film damping is dominant in the region where S0 is larger than S0min. As illustrated in FIG. 6, S0 satisfying the above Equation (12) is in the range from S0' on the side smaller than S0min to S0' on the side larger than S0min. The range from S0min to S0" requires the dimensional accuracy because a change in damping with respect to the dimensional variation of S0 is large compared with the range from S0min to S0", and thus S0 is preferably employed in the range from S0min to S0" where the dimensional accuracy can be relaxed. The same applies to cases where the above Equations (13) to (15) are satisfied.

The relationship between S0 and S1 is not particularly limited, but it is preferable to satisfy the following Equation (16), more preferably to satisfy the following Equation (17), and most preferably to satisfy the following Equation (18). When such a relationship is satisfied, a through-hole can be formed in the movable body 3 in a well-balanced manner. For example, when S1/S0>3, the increase rate of the sensitivity ratio tends to be saturated, and the minimum damping ratio tends to increase significantly. Therefore, damping can be sufficiently reduced while making the detection sensitivity sufficiently high by satisfying the following Equations (16) to (18). The sensitivity ratio is a ratio to the sensitivity when S1/S0=1, and the minimum damping ratio is a ratio to the minimum damping when S1/S0=1.

$$0.25 \leq S1/S0 \leq 3.00 \quad (16)$$

$$0.6 \leq S1/S0 \leq 2.40 \quad (17)$$

$$0.8 \leq S1/S0 \leq 2.00 \quad (18)$$

Figure 7:
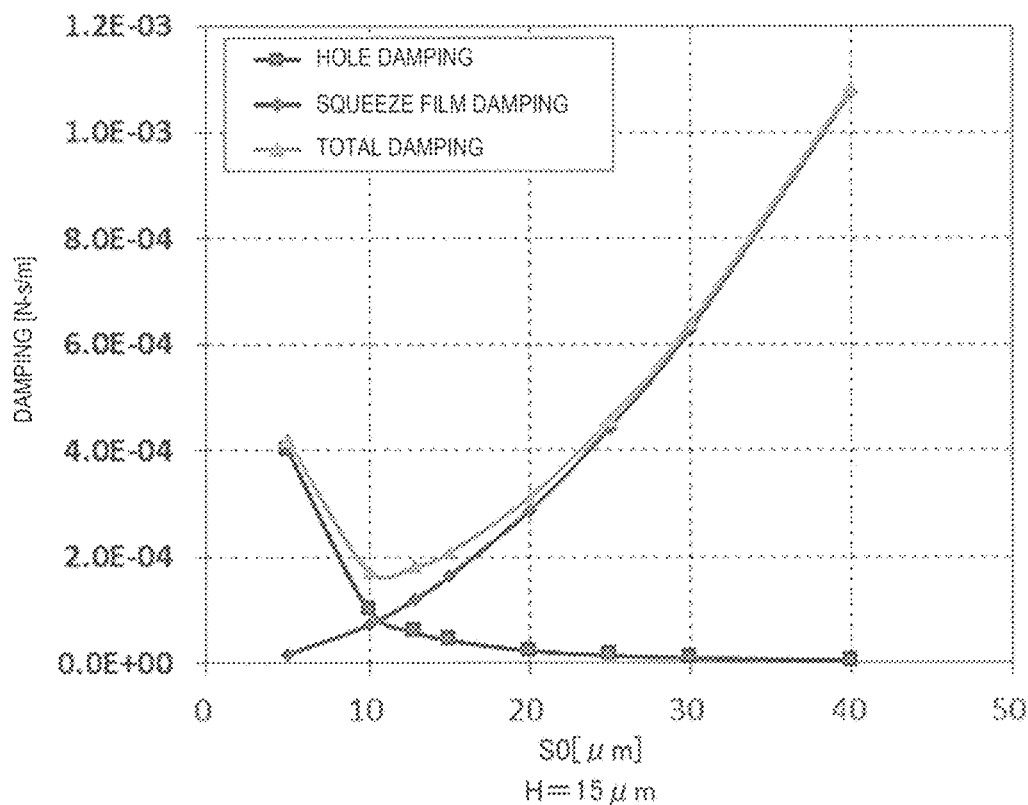
FIG. 7 is a graph illustrating a relationship between a hole size of a through-hole and damping.
Figure 8:
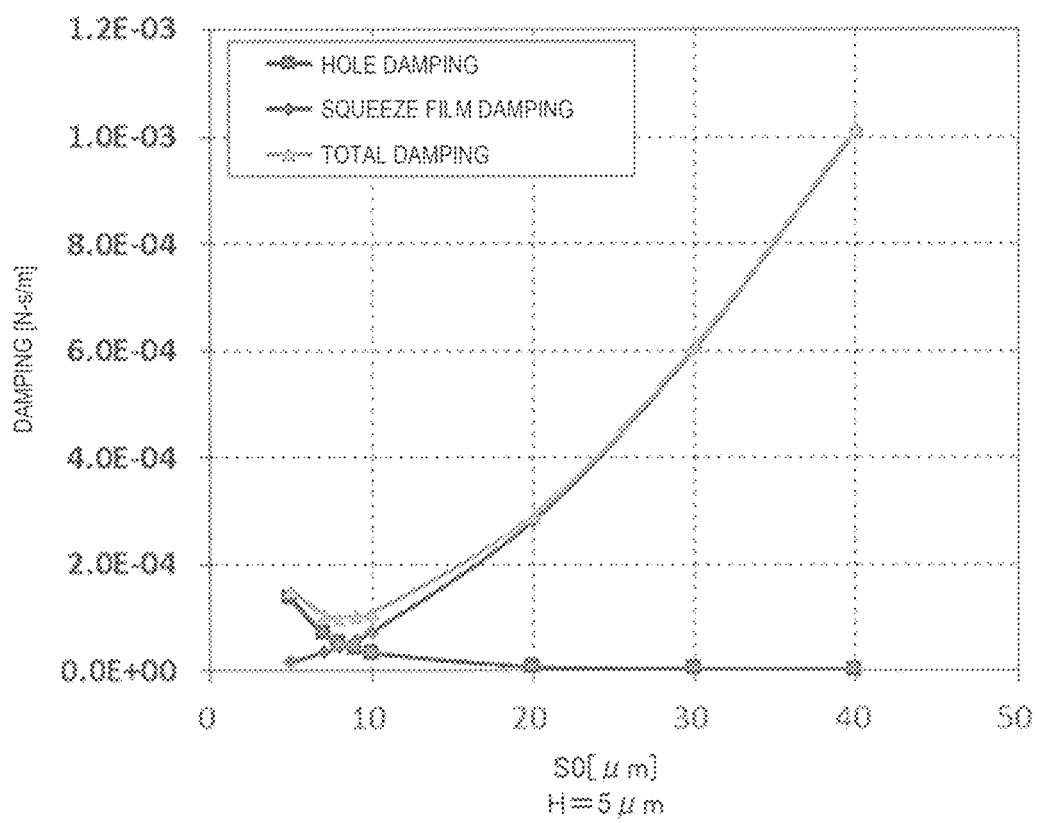
FIG. 8 is a graph illustrating a relationship between a hole size of a through-hole and damping.

FIG. 6 is a graph illustrating a relationship between S0 and damping when the depth of the through-hole, that is, the length in the Z direction is H=30 µm. On the other hand, FIGS. 7 and 8 are graphs respectively illustrating a relationship between S0 and damping when H=15 µm and H=5 µm. As described above, FIGS. 6, 7, and 8 illustrate tendencies of damping when dimensions other than the depth of the through-hole are the same, and H that is the depth of the through-hole is 30 µm, 15 µm, and 5 µm, respectively. As described above, it can be seen that, as the depth of the through-hole is reduced, the squeeze film damping is almost the same, but the hole damping becomes smaller, and, as a result, the minimum value of the total damping becomes smaller. In the present embodiment, the depth of the through-hole is made sufficiently and remarkably smaller than the maximum thickness of the movable body 3, such as 5 µm as illustrated in FIG. 8, and thus a damping reduction effect is considerably great.

Figure 9:
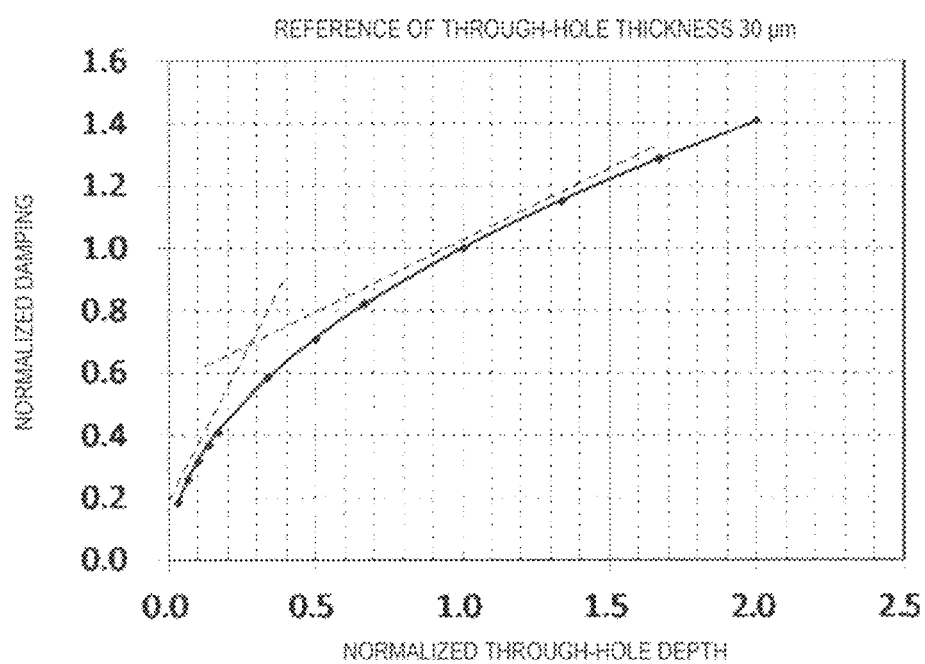
FIG. 9 is a graph illustrating a relationship between a normalized through-hole thickness and normalized damping.

FIG. 9 is a graph illustrating a relationship between a normalized through-hole depth and normalized damping. Here, for example, when a reference for the depth of the through-hole is 30 µm, the normalized through-hole depth is a through-hole depth normalized with respect to the reference. As the reference for the depth of the through-hole, for example, the maximum thickness of the movable body 3 may be used. As illustrated in FIG. 9, when the normalized through-hole depth is 0.5, damping can be reduced by about 30%. Therefore, for example, when the depth of the through-hole is set to be less than 50% of the maximum thickness of the movable body 3, which is the reference for the depth of the through-hole, the damping can be reduced by about 30%, and low damping can be realized. When the normalized through-hole depth is 0.17, the damping can be reduced by about 60%. Therefore, for example, when the depth of the through-hole is set to be less than 17% of the maximum thickness of the movable body 3, the damping can be reduced by about 60%, and thus the damping can be sufficiently reduced. As described above, in the present embodiment, the depth of the through-hole of the first through-hole group 71, the second through-hole group 72, and the like is preferably less than 50% of the maximum thickness of the movable body 3, and more preferably less than 17% of the maximum thickness of the movable body 3.

In the present embodiment, as illustrated in FIGS. 1 to 4, the opening area of the through-hole of the second through-hole group 72 in the second region 62 of the first mass portion 34 is larger than the opening area of the through-hole of the first through-hole group 71 in the first region 61. Similarly, the opening area of the through-hole of the fourth through-hole group 74 in the fourth region 64 of the second mass portion 35 is larger than the opening area of the through-hole of the third through-hole group 73 in the third region 63. The opening area of the through-hole of the fifth through-hole group 75 of the torque generator 36 is larger than the opening area of the through-hole of the first through-hole group 71, the second through-hole group 72, and the like.

For example, in the above Equation (11) that is a conditional equation that minimizes damping, the numerator has the term of $r_0^4=(0.547 \times S0)^4$, and the denominator has the term $h^3$. Therefore, when the gap distance h between the electrodes is increased, the minimum damping condition can be satisfied by increasing the length S0 of one side of the through-hole accordingly. That is, as the gap distance h is increased, the damping can be made close to the minimum value by increasing the length S0 of one side of the through-hole to increase the opening area of the through-hole.

In the present embodiment, the second gap distance h2 in the second region 62 is larger than the first gap distance h1 in the first region 61. Therefore, when the opening area of the second through-hole group 72 in the second region 62 is set to be larger than the opening area of the first through-hole group 71 in the first region 61, damping in each of the first region 61 and the second region 62 can be made close to the minimum value represented by the above Equation (11). Similarly, the fourth gap distance h4 in the fourth region 64 is larger than the third gap distance h3 in the third region 63. Therefore, when the opening area of the fourth through-hole group 74 in the fourth region 64 is set to be larger than the opening area of the third through-hole group 73 in the third region 63, damping in each of the third region 63 and the fourth region 64 can be made close to the minimum value represented by the above Equation (11).

The fifth gap distance h5 in the region of the torque generator 36 is larger than the first gap distance h1, the second gap distance h2, and the like. Therefore, when the opening area of the fifth through-hole group 75 in the region of the torque generator 36 is set to be larger than the opening area of the first through-hole group 71, the second through-hole group 72, and the like, damping in the region of the torque generator 36 can be made close to the minimum value represented by the above Equation (11).

In the present embodiment, both high sensitivity and low damping are realized. For example, element noise BNEA that is noise of the physical quantity sensor 1 is represented by the following Equation (19). IC noise CNEA that is noise of a circuit device having a detection circuit detecting a capacitance difference in a differential detection method is represented by the following Equation (20). Total noise TNEA of the element noise BNEA and the IC noise CNEA is represented by the following Equation (21). Here, $K_B$ is a Boltzmann's constant, T is an absolute temperature, M is the movable body mass, $\omega_0$ is a resonance frequency, S is sensitivity, and $\Delta C_{min}$ is a capacitance resolution of the detection circuit.

$$BNEA = \frac{\sqrt{4k_B TD}}{M} = \sqrt{\frac{4k_B T\omega_0}{MQ}} \quad (19)$$

$$CNEA = \frac{\Delta C_{min}}{S} \quad (20)$$

$$TNEA = \sqrt{BNEA^2 + CNEA^2} \quad (21)$$

As shown in the above Equation (20), the IC noise CNEA can be reduced by increasing the sensitivity S, and thus the total noise TNEA can be reduced. Consequently, noise of a sensor output signal that is output from the circuit device that is an IC chip can be reduced.

Figure 10:
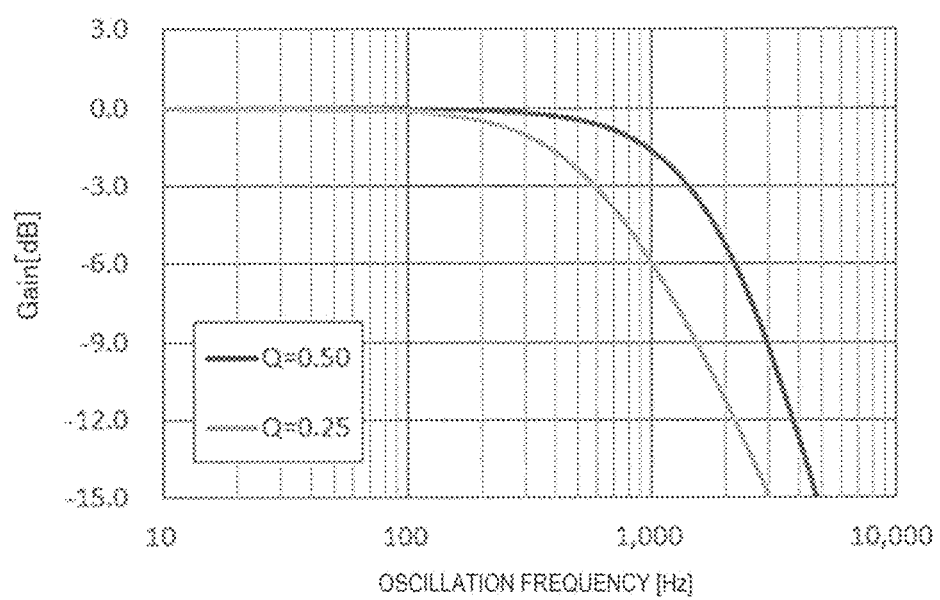
FIG. 10 is a graph illustrating a relationship between an oscillation frequency of the physical quantity sensor and the magnitude of displacement.

As shown in the above Equation (19), the element noise BNEA can be reduced by increasing the Q value and thus the total noise TNEA can be reduced. Consequently, the noise of the sensor output signal output from the circuit device can be reduced. For example, FIG. 10 is a graph illustrating the relationship between an oscillation frequency of the physical quantity sensor 1 and the magnitude of displacement of see-sawing. The Q value is inversely proportional to the damping, and the smaller the damping, the larger the Q value. As illustrated in FIG. 10, when the damping is small at Q=0.5, a gain corresponding to the magnitude of the displacement is flat in a wide frequency range compared with when the damping is large at Q=0.25. That is, by reducing the damping, the displacement of the see-sawing with respect to acceleration becomes constant over a wide frequency range, and a linear sensor output signal with respect to the acceleration can be output. That is, it is possible to secure a desired frequency bandwidth by reducing damping.

The physical quantity sensor 1 of the present embodiment may be manufactured according to a manufacturing method including a substrate forming step, a fixed electrode forming step, a substrate bonding step, a movable body forming step, and a sealing step. In the substrate forming step, for example, a glass substrate is patterned by using a photolithography method and an etching method to form the substrate 2 on which the mounts 22a and 22b for supporting the movable body 3 and the stoppers 11 and 12 are formed. In the fixed electrode forming step, a conductive film is formed on the substrate 2, and the conductive film is patterned by using a photolithography method and an etching method to form fixed electrodes such as the first fixed electrode 24 and the second fixed electrode 25. In the substrate bonding step, the substrate 2 and the silicon substrate are bonded through anode bonding or the like. In the movable body forming step, the silicon substrate is thinned to a predetermined thickness, and the silicon substrate is patterned by using a photolithography method and an etching method to form the movable body 3. In this case, the Bosch process that is a depth etching technique is used. In the sealing step, the lid 5 is bonded to the substrate 2, and the movable body 3 is stored in a space formed by the substrate 2 and the lid 5. A manufacturing method for the physical quantity sensor 1 in the present embodiment is not limited to the manufacturing method as described above, and various manufacturing methods such as a manufacturing method using a sacrificial layer may be used. In the manufacturing method using a sacrificial layer, the silicon substrate on which the sacrificial layer is formed and the substrate 2 that is a support substrate are bonded via the sacrificial layer to form a cavity in which the movable body 3 can swing in the sacrificial layer. Specifically, after the movable body 3 is formed on the silicon substrate, the cavity is formed by etching and removing the sacrificial layer interposed between the silicon substrate and the substrate 2, and the movable body 3 is released from the substrate 2. In the present embodiment, the physical quantity sensor 1 having the substrate 2 and the movable body 3 may be formed by using such a manufacturing method.

2. Second Embodiment

Figure 11:
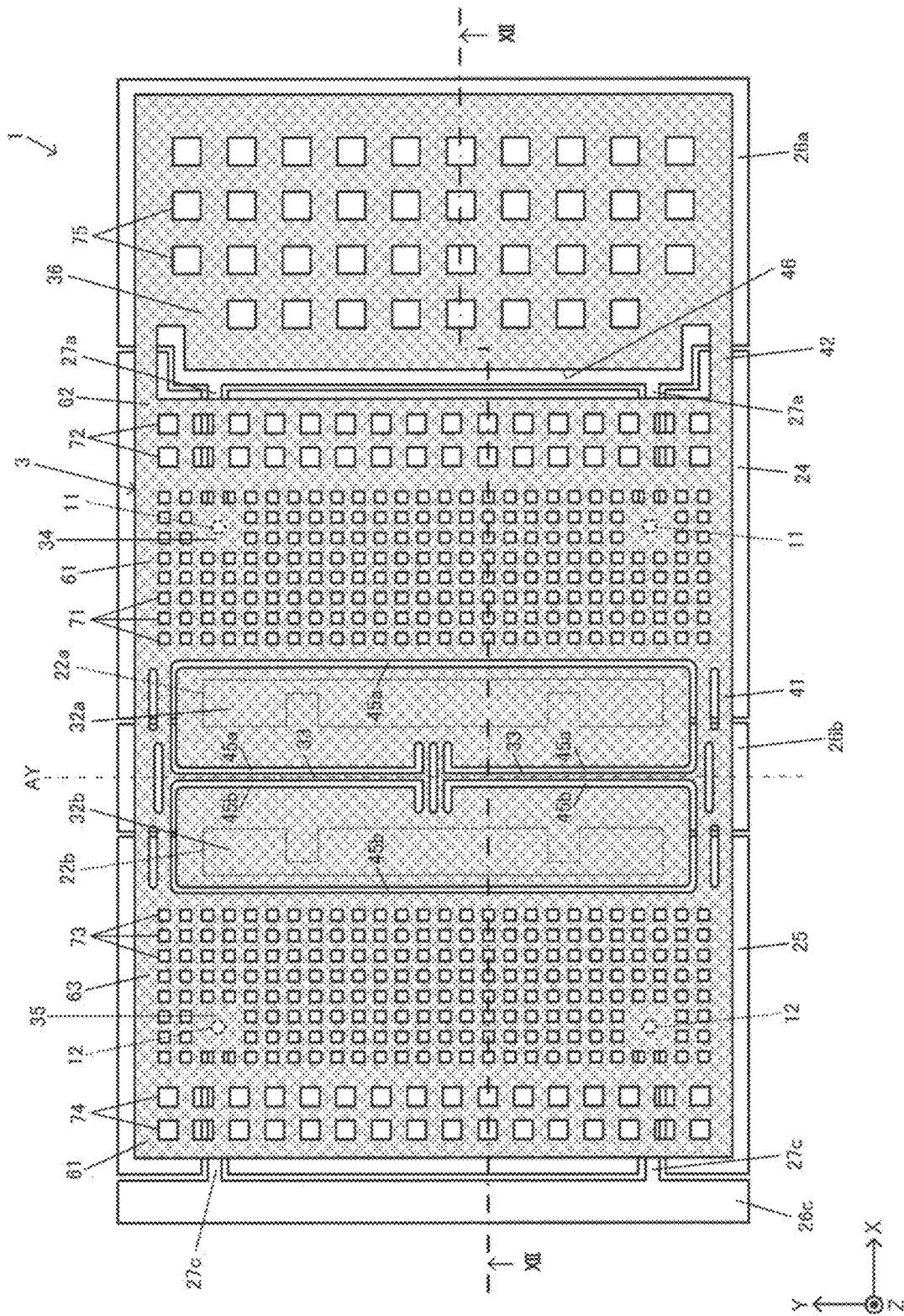
FIG. 11 is a plan view of a physical quantity sensor to a second embodiment.
Figure 12:
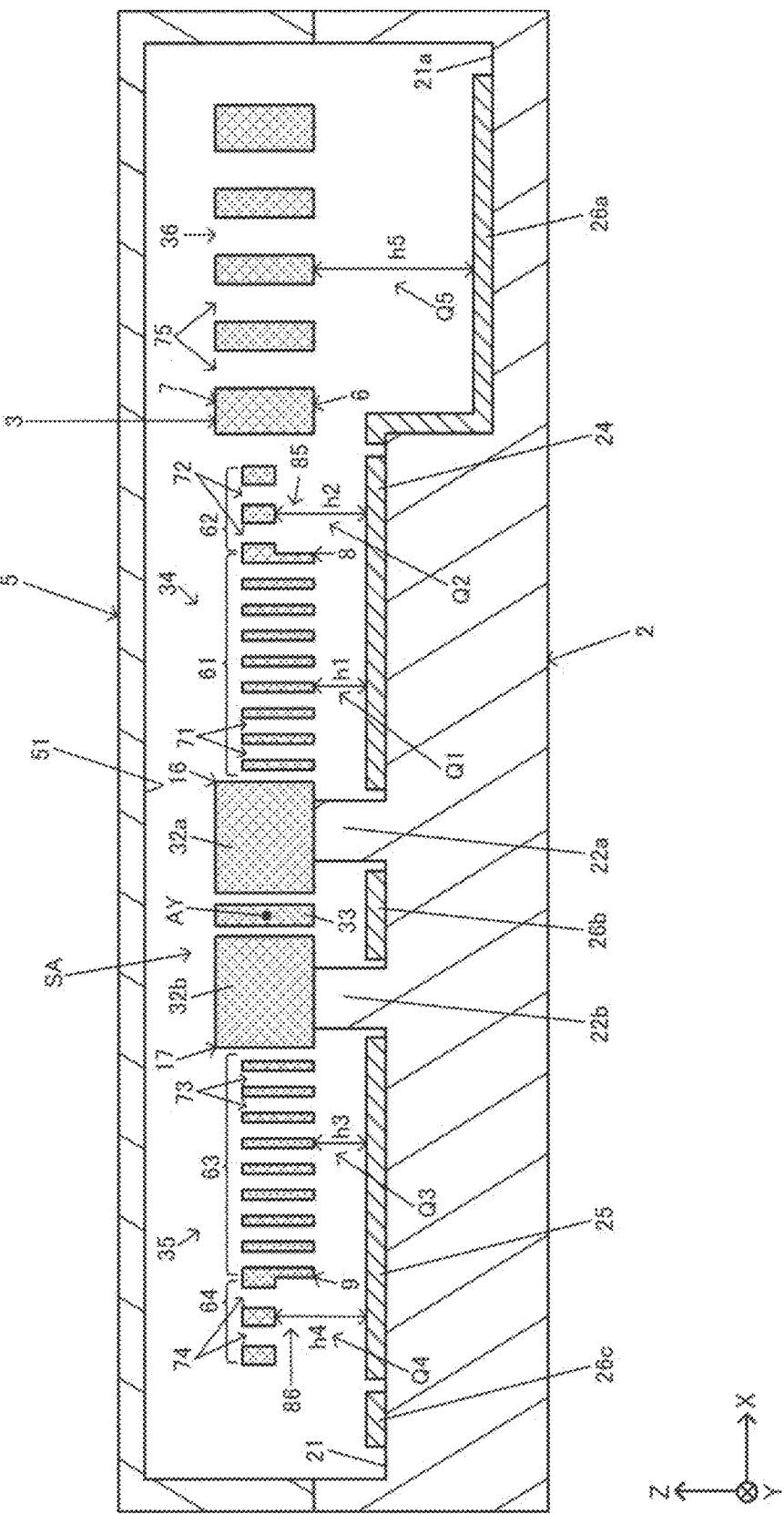
FIG. 12 is a sectional view of a physical quantity sensor of the second embodiment.

FIG. 11 is a plan view of a physical quantity sensor 1 of a second embodiment, and FIG. 12 is a sectional view taken along the line A-A in FIG. 11. Here, only portions different from those of the first embodiment will be described. In the first embodiment in FIGS. 1 to 4, the second surface 7 that is the upper surface in each of the first region 61 to the fourth region 64 has a recess shape. In contrast, in the second embodiment, the second surface 7 in the first region 61 and the second region 62 has a flat shape, and the second surface 7 in the third region 63 and the fourth region 64 also has a flat shape. A thickness of the first region 61 and the second region 62 in the Z axis direction and a thickness of the third region 63 and the fourth region 64 in the Z axis direction are smaller than a thickness of the support beam 33 or the fixing portions 32a and 32b in the Z axis direction and smaller than the maximum thickness of the movable body 3. That is, the thickness of the first region 61 and the second region 62 or the thickness of the third region 63 and the fourth region 64 is uniformly reduced by providing a step 16 between the fixing portion 32a and the first region 61 or providing a step 17 between the fixing portion 32b and the third region 63.

Specifically, in the second embodiment in FIGS. 11 and 12, a recess 85 of which the second through-hole group 72 is disposed in a bottom surface is provided at the first surface 6 of the movable body 3 in the second region 62. Similarly, a recess 86 of which the fourth through-hole group 74 is disposed in a bottom surface is provided at the first surface 6 of the movable body 3 in the fourth region 64. In the recesses 85 and 86, it is desirable to provide walls along the X axis direction and walls along the Y axis direction to surround the disposition regions of the second through-hole group 72 and the fourth through-hole group 74, respectively.

When the recess 85 is provided at the first surface 6 of the second region 62 as described above, the disposition region of the second through-hole group 72 in the second region 62 is located above. Therefore, the first gap distance h1 in the first region 61 can be made smaller than the second gap distance h2 in the second region 62, and the depth of the second through-hole group 72 can be reduced, so that it is possible to realize high sensitivity and low damping. Similarly, when the recess 86 is provided at the first surface 6 of the fourth region 64, the disposition region of the fourth through-hole group 74 in the fourth region 64 is located above. Therefore, the third gap distance h3 in the third region 63 can be made smaller than the fourth gap distance h4 in the fourth region 64, and the depth of the fourth through-hole group 74 can be reduced, so that it is possible to realize high sensitivity and low damping. When the first surface 6 in the second region 62 and the fourth region 64 is formed into a recess shape having the walls, the strength is increased by the walls of the recesses 85 and 86, and thus the rigidity of the movable body 3 can be ensured.

As described above, also in the second embodiment, the depth of the through-hole can be reduced, and low damping can be realized. However, in the second embodiment, compared with the first embodiment, the depth of the through-hole cannot be reduced, and thus the damping reduction effect is inferior, but the rigidity of the movable body 3 can be increased, and thus the impact resistance is excellent.

The features of the present embodiment described in the first embodiment, such as the opening area of the through-hole of the second through-hole group 72 being larger than that of the first through-hole group 71, the opening area of the through-hole of the fifth through-hole group 75 being larger than that of the first through-hole group 71 and the second through-hole group 72, and the depth of the through-hole being less than 50% of the maximum thickness of the movable body 3, may also be applied to the second embodiment. The same applies to each embodiment described below. In FIG. 12, the gap distances in each region are made different by providing the steps 8 and 9, but the gap distances may be made different by providing the slopes 14 and 15 as in FIG. 5, and, regarding a method of designing the through-hole in each region, the same method as in the first embodiment may be employed. These details are also the same for each of the embodiments described below.

3. Third Embodiment

Figure 13:
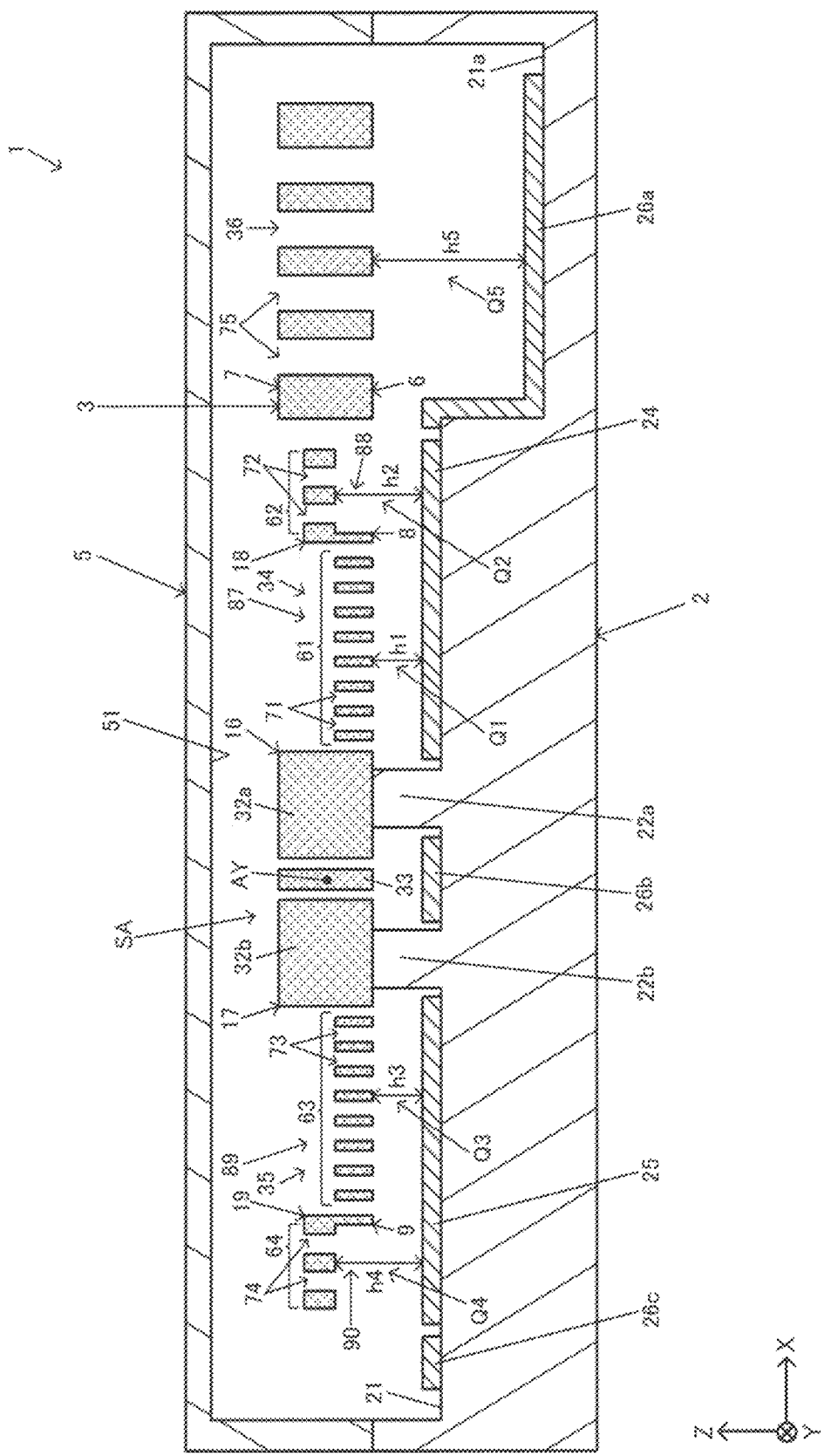
FIG. 13 is a sectional view of a physical quantity sensor of a third embodiment.

FIG. 13 is a sectional view of a physical quantity sensor 1 of a third embodiment. Here, only portions different from those of the second embodiment will be described. In the second embodiment, the second surface 7 side of the first region 61 and the second region 62 of the first mass portion 34, or the second surface 7 side of the third region 63 and the fourth region 64 of the second mass portion 35 has a flat shape. In contrast, in the third embodiment, as illustrated in FIG. 13, a step 18 is provided between the first region 61 and the second region 62, and thus a shape is not flat. That is, the height of the second surface 7 of the movable body 3 is lowered in the order of the fixing portion 32a, the second region 62, and the first region 61. A step 19 is provided between the third region 63 and the fourth region 64, and thus a shape is not flat. That is, the height of the second surface 7 of the movable body 3 is lowered in the order of the fixing portion 32b, the fourth region 64, and the third region 63.

Specifically, in the third embodiment in FIG. 13, a first recess 87 of which the first through-hole group 71 is disposed in a bottom surface is provided at the second surface 7 of the movable body 3 in the first region 61. Similarly, a third recess 89 of which the third through-hole group 73 is disposed in a bottom surface is provided at the second surface 7 of the movable body 3 in the third region 63. On the other hand, a second recess 88 of which the second through-hole group 72 is disposed in a bottom surface is provided at the first surface 6 of the movable body 3 in the second region 62. Similarly, a fourth recess 90 of which the fourth through-hole group 74 is disposed in a bottom surface is provided at the first surface 6 of the movable body 3 in the fourth region 64. It is desirable to provide walls along the X axis direction or walls along the Y axis direction to surround the disposition regions of the first through-hole group 71, the second through-hole group 72, the third through-hole group 73, and the fourth through-hole group 74, respectively, in the first recess 87, the second recess 88, the third recess 89, and the fourth recess 90.

The depths of the first through-hole group 71 and the third through-hole group 73 can be reduced by providing the first recess 87 and the third recess 89 in the first region 61 and the third region 63 as described above, and thus it is possible to realize low damping. It is also possible to increase the strength by using the walls of the first recess 87 and the third recess 89 to ensure the rigidity of the movable body 3. When the second recess 88 is provided at the first surface 6 of the second region 62, the disposition region of the second through-hole group 72 in the second region 62 is located above. Therefore, the first gap distance h1 in the first region 61 can be made smaller than the second gap distance h2 in the second region 62, and the depth of the second through-hole group 72 can also be made smaller, so that it is possible to realize high sensitivity and low damping. When the fourth recess 90 is provided at the first surface 6 of the fourth region 64, the disposition region of the fourth through-hole group 74 in the fourth region 64 is located above. Therefore, the third gap distance h3 in the third region 63 can be made smaller than the fourth gap distance h4 in the fourth region 64, and the depth of the fourth through-hole group 74 can also be made smaller, so that it is possible to realize high sensitivity and low damping.

According to the third embodiment, the rigidity of the movable body 3 is lower than that in the second embodiment, but the depths of the first through-hole group 71 and the third through-hole group 73 can be made smaller, and thus damping can be further reduced.

4. Fourth Embodiment

Figure 14:
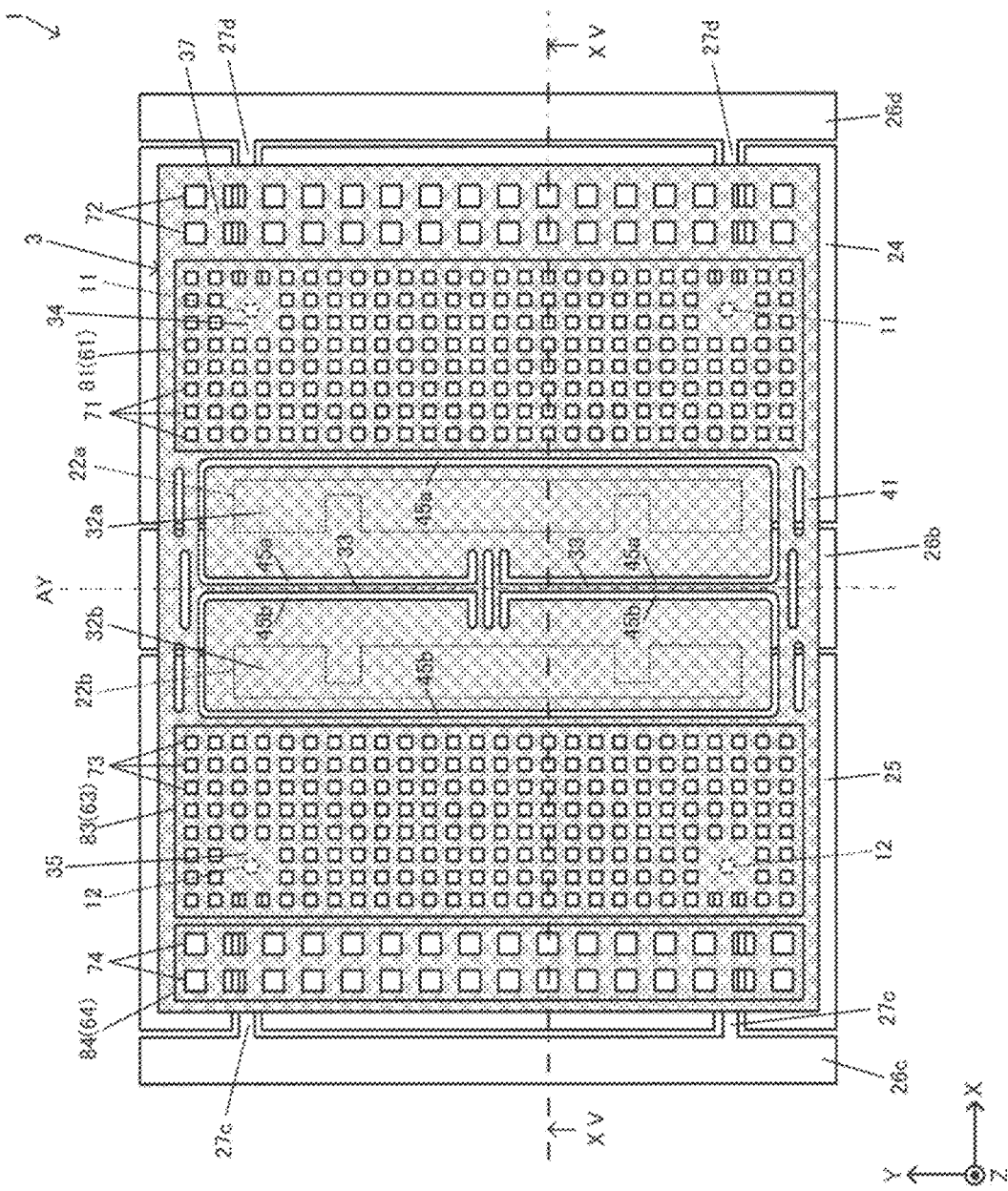
FIG. 14 is a plan view of a physical quantity sensor of a fourth embodiment.
Figure 15:
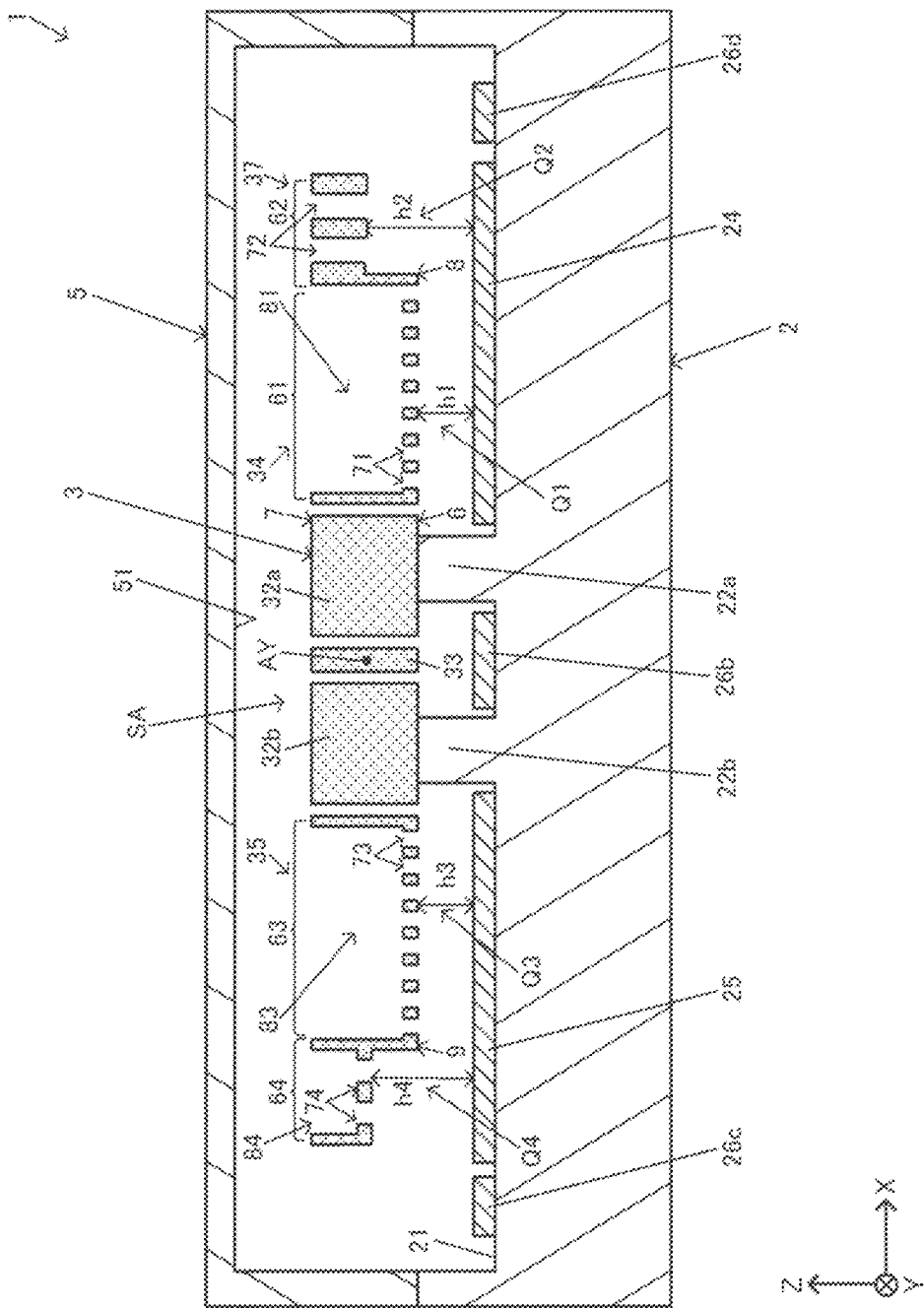
FIG. 15 is a sectional view of a physical quantity sensor of the fourth embodiment.

FIG. 14 is a plan view of a physical quantity sensor 1 of a fourth embodiment, and FIG. 15 is a sectional view taken along the line XV-XV in FIG. 14. Here, only portions different from those of the first embodiment will be described.

In the first embodiment in FIGS. 1 to 4, the torque generator 36 is provided on the positive side in the X axis direction of the first mass portion 34 in order to generate a rotational torque. That is, the length of the movable body 3 in the longitudinal direction is made asymmetric with respect to the rotation axis AY. In contrast, in the fourth embodiment, the length of the movable body 3 in the X axis direction that is a longitudinal direction is made symmetric with respect to the rotation axis AY. In order to generate a rotational torque, the first mass portion 34 and the second mass portion 35 are designed such that sectional shapes thereof are intentionally different. Specifically, in the second mass portion 35, the fourth recess 84 is formed at the second surface 7 in the fourth region 64, but, in the first mass portion 34, a recess is not formed at the second surface 7 in the second region 62. Since a recess is not formed in the second region 62 as described above, the mass in the second region 62 is larger than the mass in the fourth region 64, and a rotational torque can be generated when acceleration is applied. That is, in the fourth embodiment, the second region 62 of the first mass portion 34 is a torque generator 37 for generating a rotational torque about the rotation axis AY.

As described above, in the fourth embodiment, the length of the movable body 3 in the X axis direction is made symmetric with respect to the rotation axis AY, and the mass unbalance of the movable body 3 is intentionally generated such that the rotational torque is generated. Therefore, it is possible to reduce the size while achieving the same effect as that of the first embodiment. Since deep digging of the substrate 2 is not required directly under the torque generator 36 like the first embodiment, the process can be simplified and thus cost can be reduced.

As illustrated in FIG. 14, in the fourth embodiment, a dummy electrode 26d is disposed at the positive side in the X axis direction of the first mass portion 34. An electrode 27d is pulled out from the dummy electrode 26d on the negative side in the X axis direction, and the tip of the pulled out electrode 27d is provided to cover the top of the stopper 11. Since the dummy electrode 26d is set to have the same potential as that of the movable body 3, a short circuit is prevented even when the movable body 3 comes into contact with the stopper 11. Alternatively, even when the stopper 11 is not provided on the substrate 2, a dummy electrode may be provided in a region directly under the tip of the movable body 3 of the substrate 2.

As described above, the number of regions provided in the first mass portion 34 is not limited to two, and steps may be provided between adjacent regions, and a region RA1 to a region RAn disposed in the order closer to the rotation axis AY may be provided. In this case, the second region 62 that is the torque generator 37 is, for example, the region RAn far from the rotation axis AY. Among the regions RA1 to RAn−1, the first region 61 is a region closer to the rotation axis AY than the region RAn. Two or more regions far from the rotation axis AY, such as region RAn and region RAn−1, may be set in the torque generator 37 by not forming a recess at the second surface 7, for example.

5. Fifth Embodiment

Figure 16:
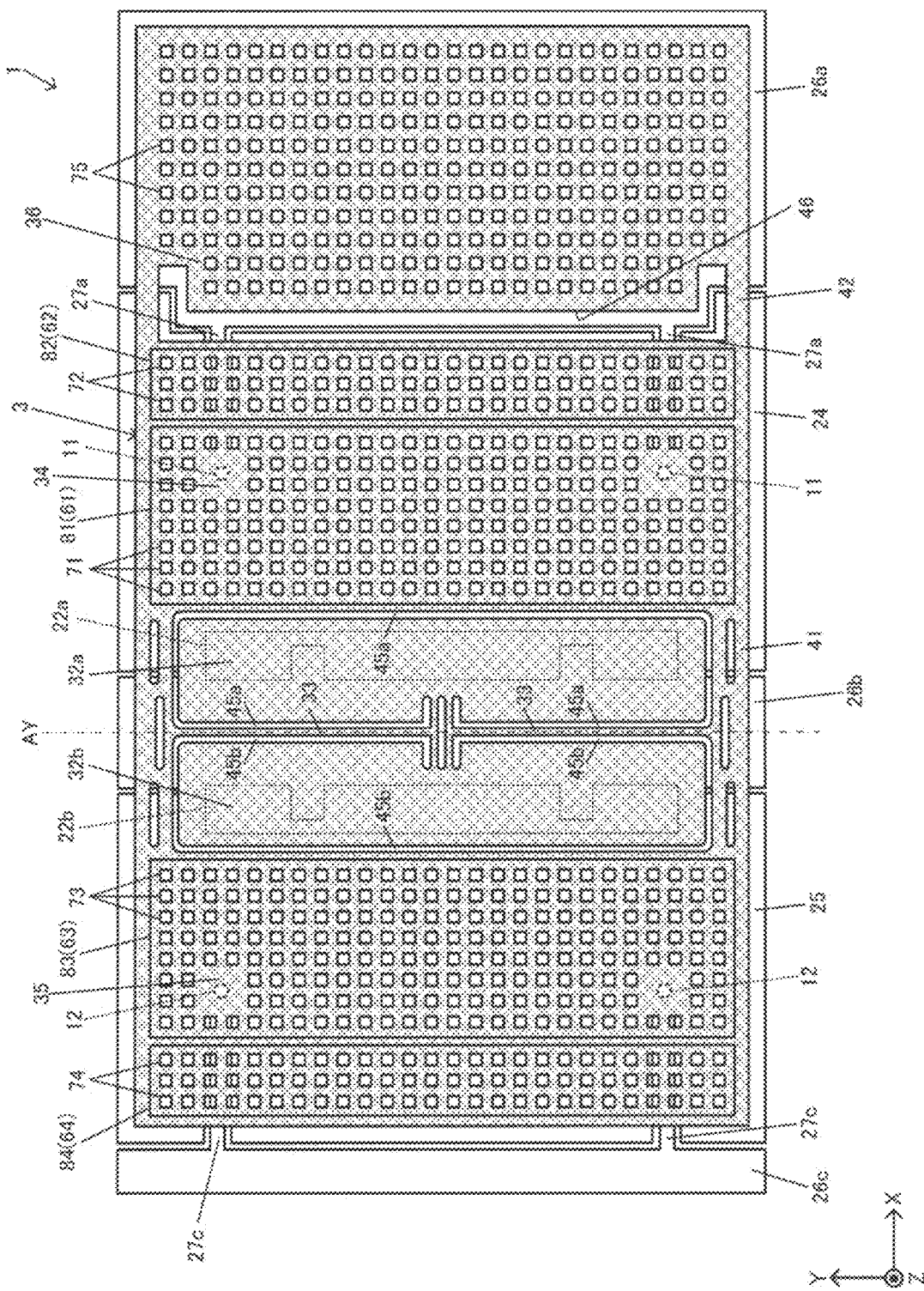
FIG. 16 is a plan view of a physical quantity sensor of a fifth embodiment.

FIG. 16 is a plan view of a physical quantity sensor 1 of a fifth embodiment. Here, only portions different from those of the first embodiment will be described. In the first embodiment, the through-hole dimensions to which the damping minimization condition described in the above Equation (11) or the like is applied are set in each region such as the first region 61 to the fourth region 64 and the region of the torque generator 36. In contrast, in the fifth embodiment, through-hole dimensions to which the damping minimization condition is applied is set only in the first region 61 and the third region 63 close to the rotation axis AY, and the same through-hole dimensions as those in the first region 61 and the third region 63 are used in the other regions. That is, as illustrated in FIG. 16, in the second region 62, the fourth region 64, and the region of the torque generator 36, a through-hole having the same opening area as that of the through-hole of the first region 61 and the third region 63 is provided.

As described above, in the fifth embodiment, the through-hole dimensions to which the damping minimization condition is applied are set in, for example, only the through-hole of the region close to the rotation axis AY among the plurality of regions of the movable body 3. That is, it is desirable to apply the damping minimization condition according to a gap distance in each of a plurality of regions, but, even when the damping minimization condition is applied to only a specific region among these regions, a sufficient effect can be achieved.

6. Sixth Embodiment, Seventh Embodiment, and Eighth Embodiment

Figure 17:
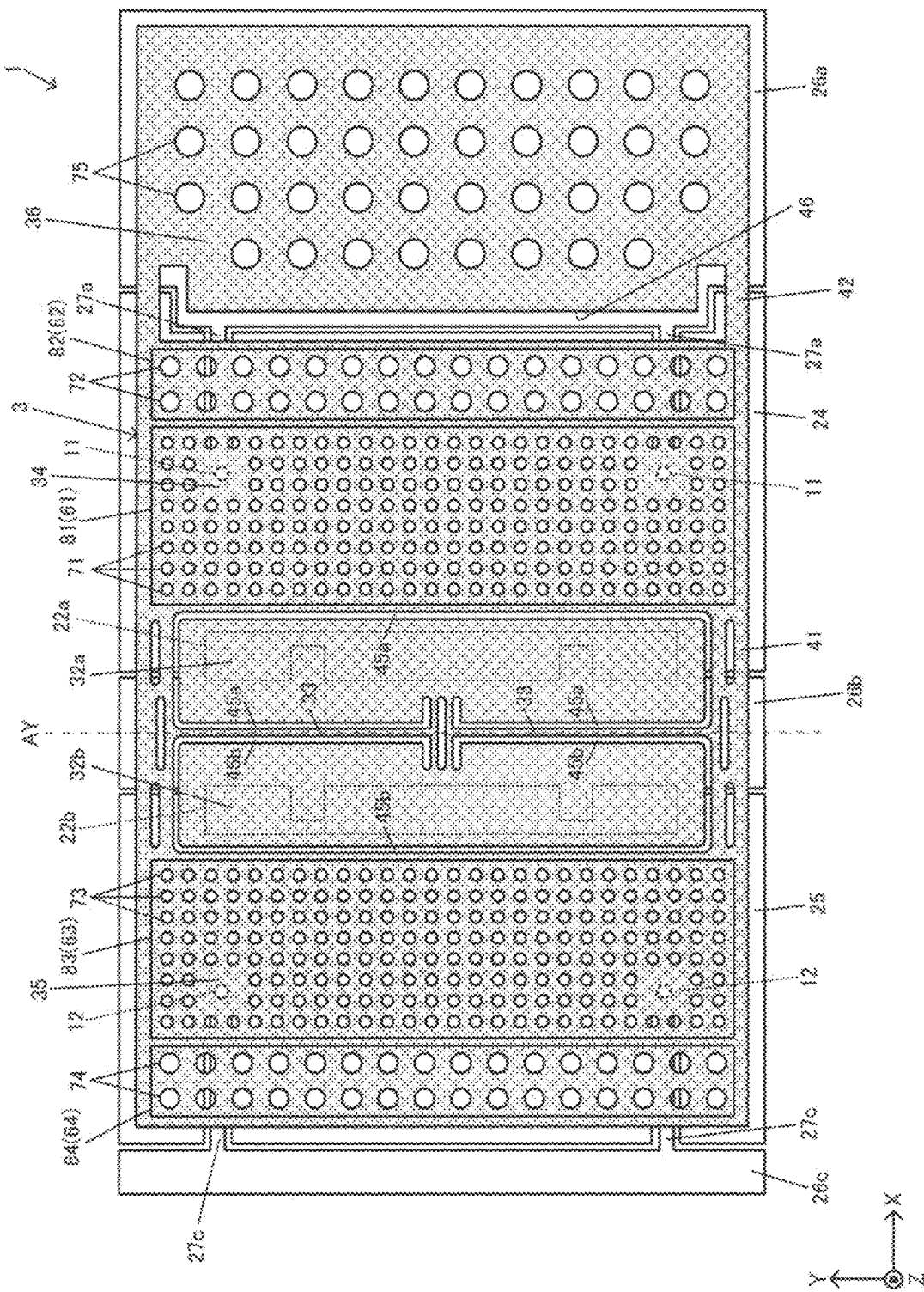
FIG. 17 is a plan view of a physical quantity sensor of a sixth embodiment.
Figure 18:
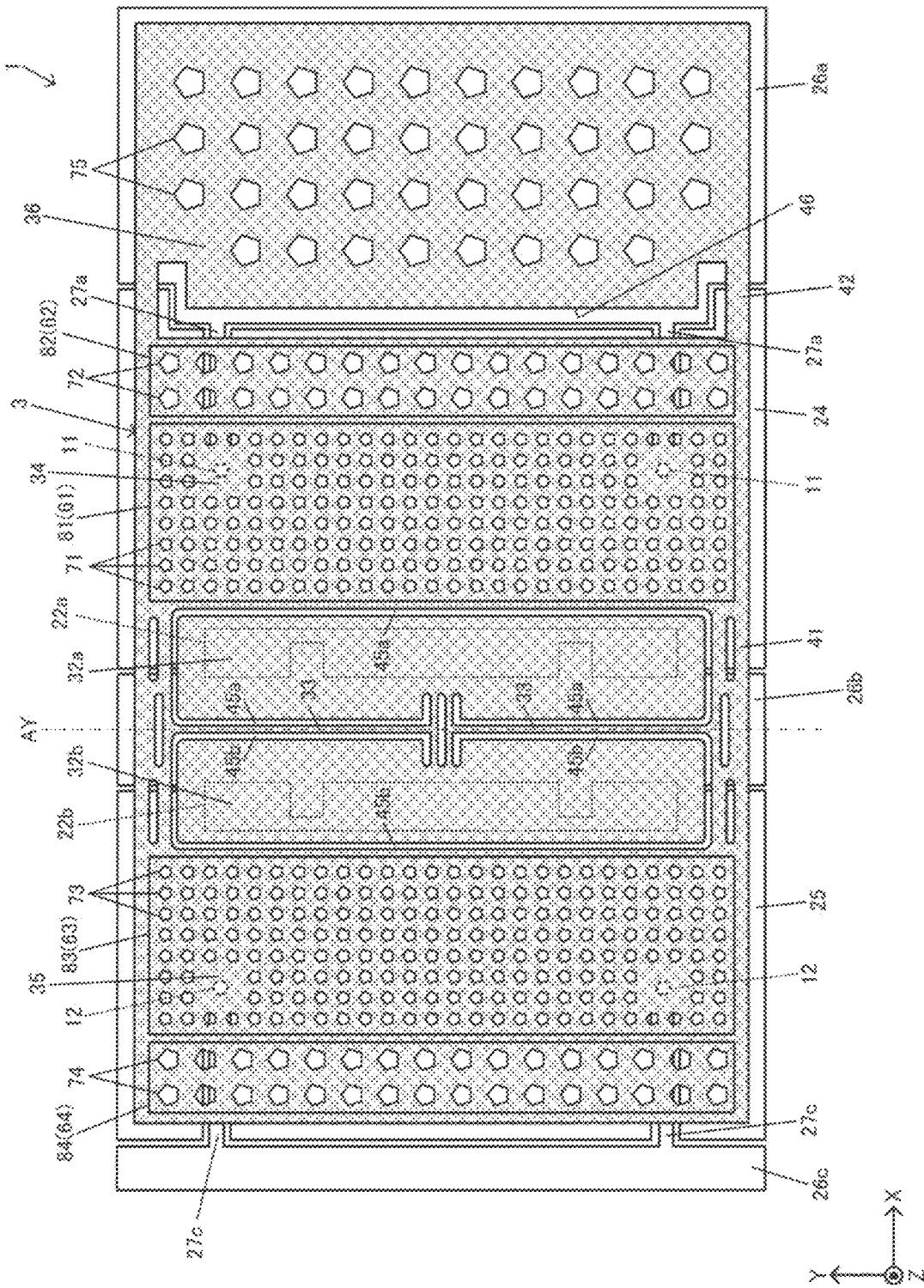
FIG. 18 is a plan view of a physical quantity sensor of a seventh embodiment.
Figure 19:
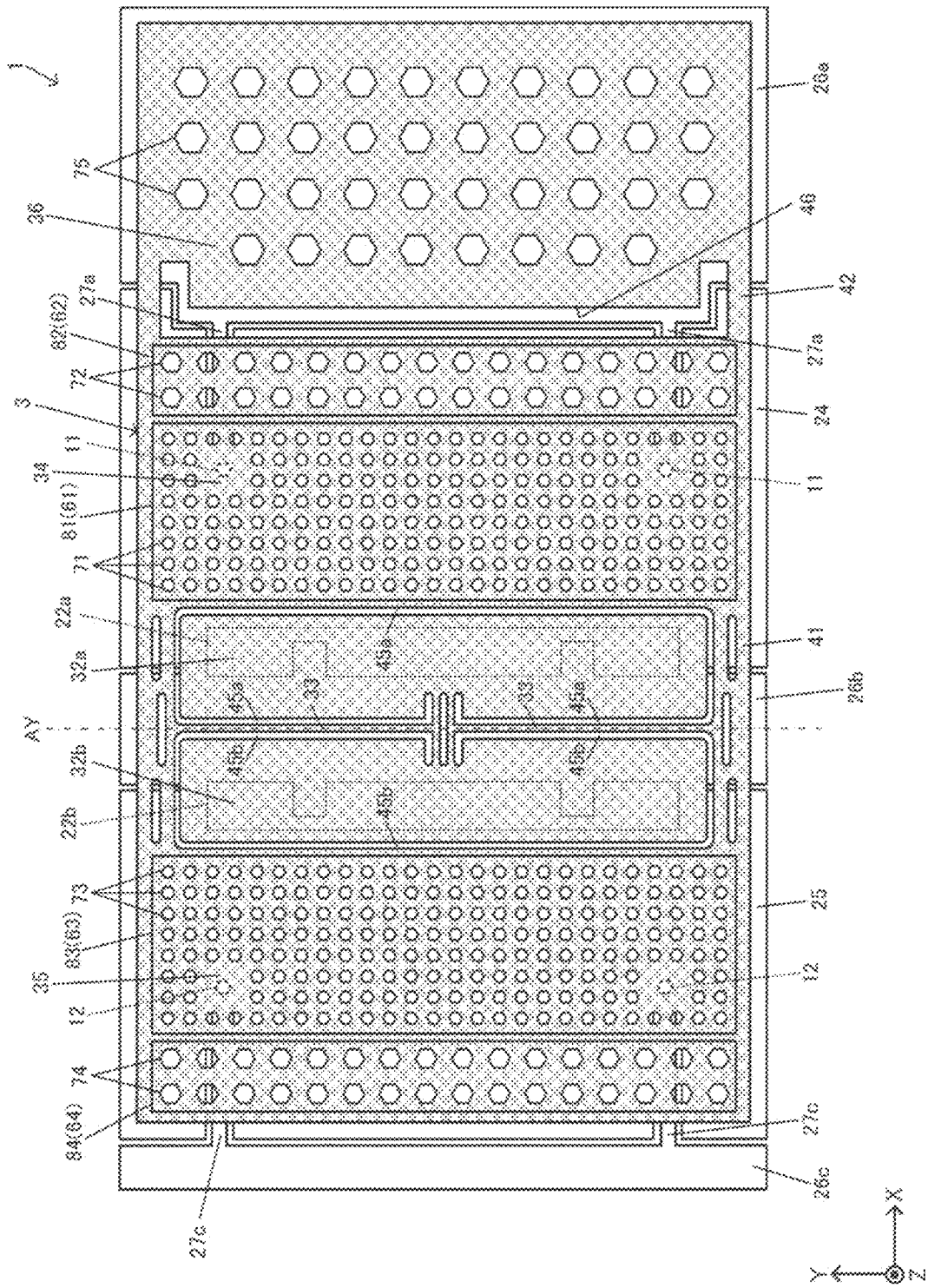
FIG. 19 is a plan view of a physical quantity sensor of an eighth embodiment.

FIG. 17, FIG. 18, and FIG. 19 are respective plan views of a physical quantity sensor 1 of a sixth embodiment, a seventh embodiment, and an eighth embodiment. The sixth embodiment, the seventh embodiment, and the eighth embodiment are different from the first embodiment in that an opening shape of a through-hole is changed from a square shape to a circular shape in the sixth embodiment in FIG. 17, changed from a square shape to a pentagonal shape in the seventh embodiment in FIG. 18, and changed from a square shape to a hexagonal shape in the eighth embodiment in FIG. 19. In the sixth embodiment, the seventh embodiment, and the eighth embodiment, an opening shape of a through-hole is different from that in the first embodiment, but the same effect can be achieved as an effect related to damping.

As described above, in the physical quantity sensor 1 of the present embodiment, the opening shape of the through-hole of the first through-hole group 71, the second through-hole group 72, or the like is a circular shape or a polygonal shape. It is possible to realize low damping by providing such a through-hole having a circular or polygonal opening shape. Here, the polygonal shape is not limited to a square shape, a pentagonal shape, and a hexagonal shape as illustrated in FIGS. 1, 18, and 19, and may be polygonal shapes other than the square shape, the pentagonal shape, and the hexagonal shape. For example, the through-hole may have a rectangular shape other than a square shape. The circular shape is not limited to a perfect circular shape, and may be an elliptical shape or the like.

When the shape of the through-hole is shapes other than a square shape, through-hole dimensions to which the damping minimization condition described in the above Equations (1) to (11) and the like is applied may be calculated as follows. For example, it is assumed that the opening shape of the through-hole is a polygonal shape other than a square shape in a plan view from the Z axis direction. In this case, 0.75≤A1/A2≤1.25, where A1 is an area of the polygonal shape and A2 is an area of the square shape, and the opening shape of the through-hole may be regarded as the square shape and the through-hole dimensions may be calculated. When the opening shape of the through-hole is a perfect circular shape in a plan view from the Z axis direction, the through-hole dimensions may be calculated by using $r_c$ of the above Equation (7) as a half of a distance between the centers of the adjacent through-holes, and $r_0$ of the above Equation (8) as a length of the through-hole radius. It is assumed that the opening shape of the through-hole is an elliptical shape in a plan view from the Z axis direction. In this case, 0.75≤A1/A2≤1.25, where A1 is an area of the elliptical shape and A2 is an area of the perfect circular shape, and the opening shape of the through-hole may be regarded as the perfect circular shape and the through-hole dimensions may be calculated.

7. Ninth Embodiment

Figure 20:
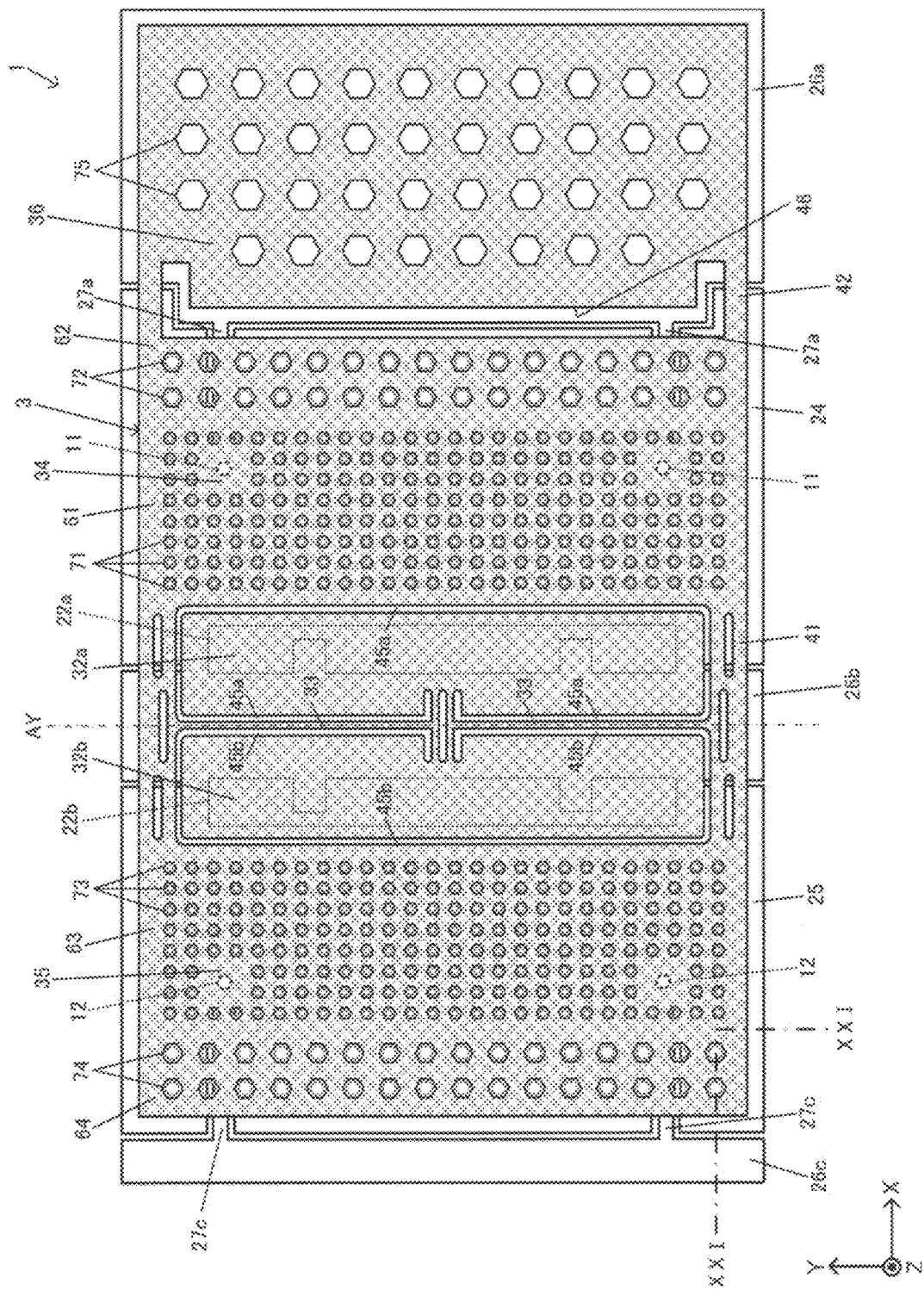
FIG. 20 is a plan view of a physical quantity sensor of a ninth embodiment.
Figure 21:
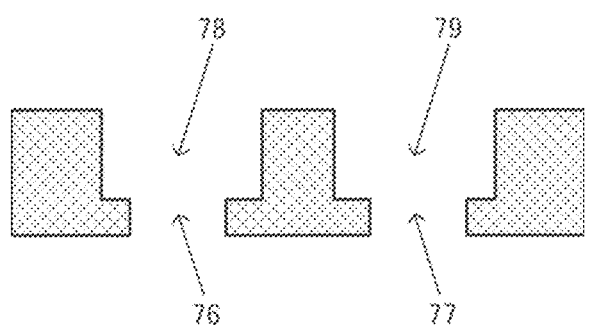
FIG. 21 is a sectional view taken along the line XXI-XXI in FIG. 20.

FIG. 20 is a plan view of a physical quantity sensor 1 of a ninth embodiment, and FIG. 21 is a sectional view taken along the line XXI-XXI in FIG. 20. In the ninth embodiment, the same shape of the through-hole as that in the eighth embodiment is employed. However, in the ninth embodiment, as illustrated in FIG. 21, the thickness of the movable body 3 is equal to the depth of the through-holes 76 and 77 around the through-holes 76 and 77, but the thickness of the movable body 3 is different from the depth of the through-hole 76 and 77 between the ends of the through-holes 76 and 77. That is, a recess 78 is provided in the through-hole 76, and a recess 79 is provided in the through-hole 77, so that each through-hole is provided with the recess. As described above, in the ninth embodiment, as illustrated in FIGS. 20 and 21, a recess is provided in at least one through-hole of at least one of the first through-hole group 71 and the second through-hole group 72. Similarly, a recess is provided in at least one through-hole of at least one of the third through-hole group 73 and the fourth through-hole group 74.

For example, in the first embodiment, the eighth embodiment, and the like, since the recess is provided in each of the first region 61 to the fourth region 64, the thickness of the recess in the wall is increased to ensure the rigidity. In contrast, in the ninth embodiment, a recess is provided for each at least one through-hole of each through-hole group, and a wall of the recess having a large thickness is provided around the through-hole to ensure rigidity. Consequently, the strength of the movable body 3 can be increased to ensure the rigidity without increasing damping much. In FIGS. 20 and 21, a recess is provided for each through-hole, but it is sufficient that a recess is provided for each of at least one through-hole. For example, a recess may be provided in units of a plurality of through-holes. For example, a recess is provided for each of at least one through-hole such that a plurality of recesses are provided in each region of the first region 61 to the fourth region 64. When the recess is provided for each of at least one through-hole as described above, an opening shape of the through-hole is not limited to a hexagonal shape as illustrated in FIG. 20, and may be polygonal shapes other than the hexagonal shape as illustrated in FIGS. 1 and 18 or may be a circular shape as illustrated in FIG. 17.

8. Tenth Embodiment

Figure 22:
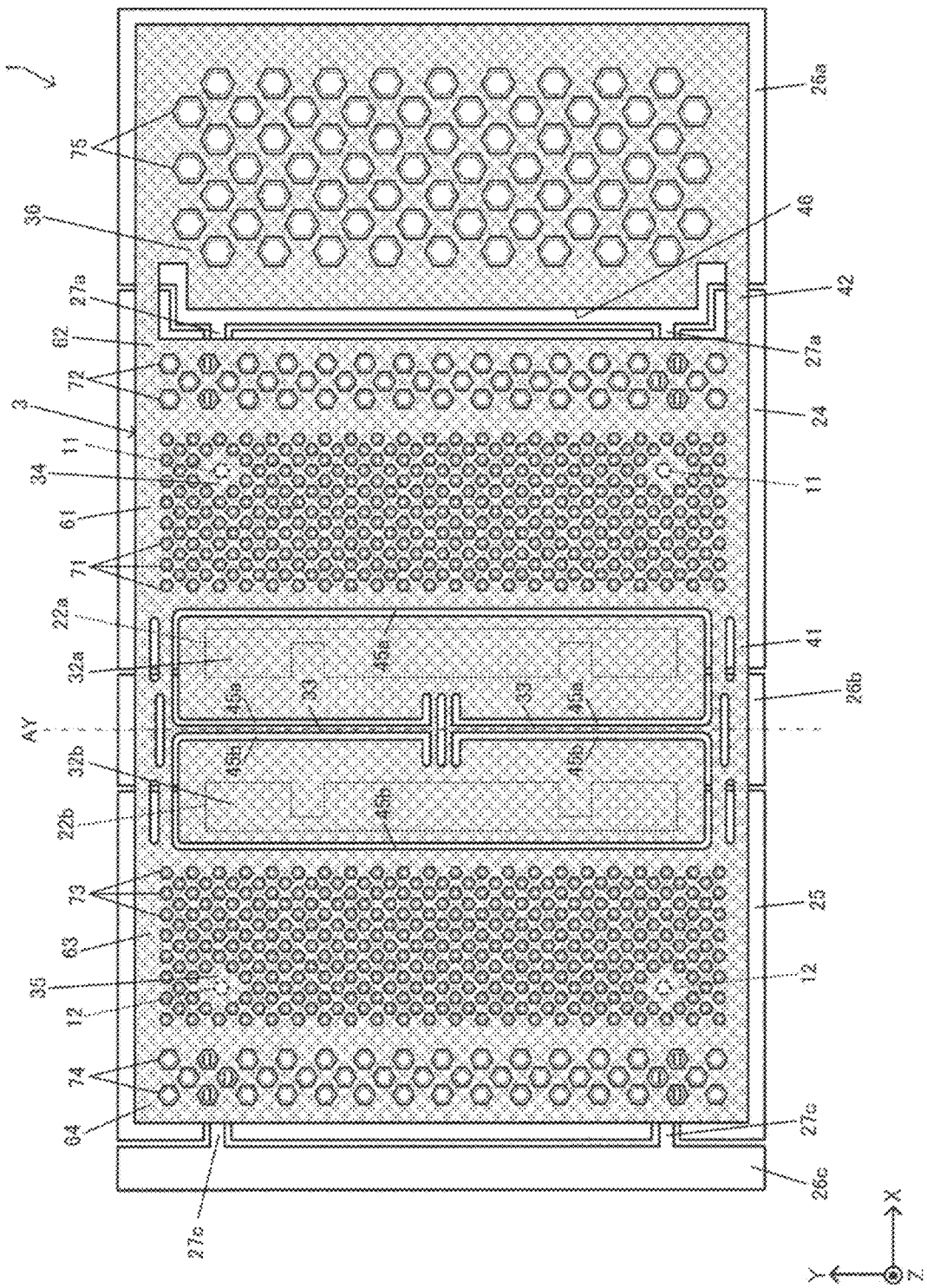
FIG. 22 is a plan view of a physical quantity sensor of a tenth embodiment.

FIG. 22 is a plan view of a physical quantity sensor 1 according to a tenth embodiment. In the tenth embodiment, the through-holes are arranged in an arrangement method different from the arrangement method of the ninth embodiment. That is, in the tenth embodiment, an arrangement of the through-holes is a honeycomb arrangement that is regarded to provide high strength. In the tenth embodiment, in the same manner as in the ninth embodiment, a recess is provided for each through-hole, and the thickness of the movable body 3 between the ends of the through-holes is larger than that in the periphery of the through-hole. As described above, even when the depth of the through-hole is reduced, the strength of the movable body can be further increased by using an arrangement such as a honeycomb arrangement.

As described above, the physical quantity sensor 1 of the first embodiment to the tenth embodiment has been described as the physical quantity sensor 1 of the present embodiment, but the physical quantity sensor 1 of the present embodiment is not limited to this. Various modifications may occur. For example, the physical quantity sensor 1 of the present embodiment may be the physical quantity sensor 1 configured as a combination of at least two of the first embodiment to the tenth embodiment. In the above description, the case where the physical quantity sensor 1 is an acceleration sensor has been mainly described, but the present embodiment is not limited to this, and the physical quantity sensor 1 may be a sensor that detects an angular velocity, a velocity, a pressure, a displacement, or gravity that is a physical quantity other than the acceleration.

9. Physical Quantity Sensor Device

Figure 23:
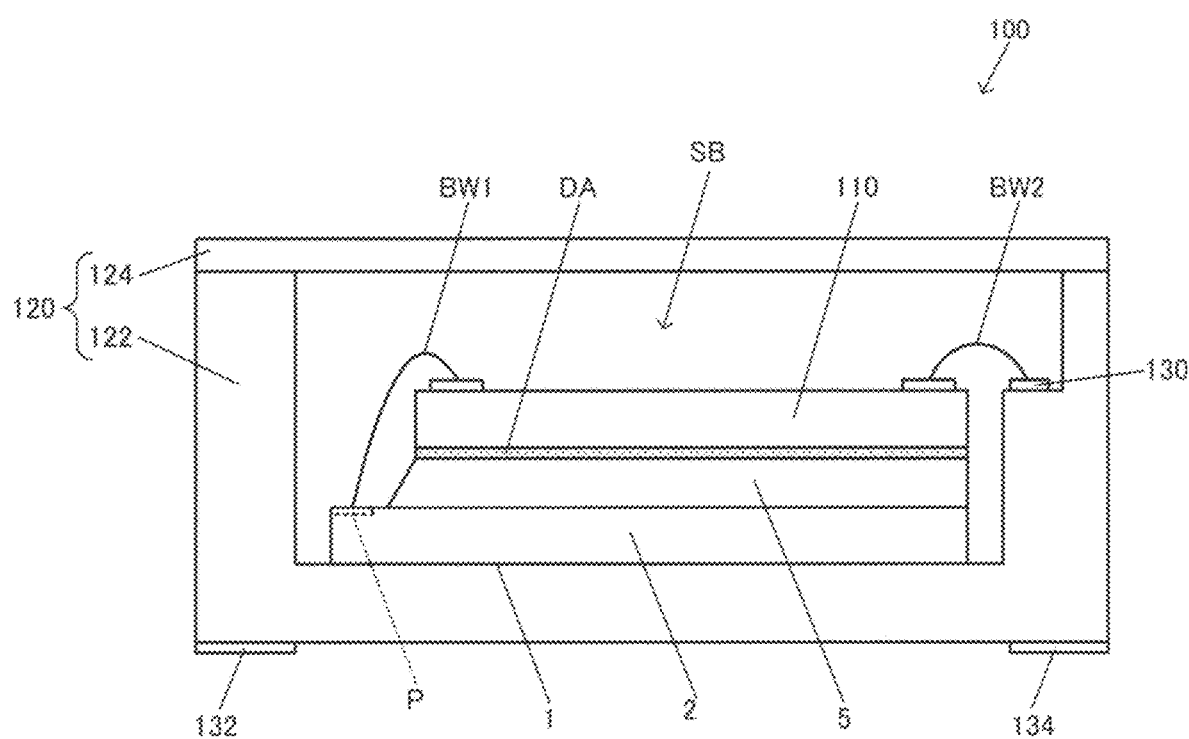
FIG. 23 illustrates a configuration example of a physical quantity sensor device.

Next, a physical quantity sensor device 100 of the present embodiment will be described with reference to FIG. 23. FIG. 23 is a sectional view of the physical quantity sensor device 100. The physical quantity sensor device 100 includes the physical quantity sensor 1 and an integrated circuit (IC) chip 110 as an electronic component. The IC chip 110 may also be called a semiconductor chip and is a semiconductor element. The IC chip 110 is bonded to the upper surface of the lid 5 of the physical quantity sensor 1 via a die attach material DA that is a bonding member. The IC chip 110 is electrically coupled to an electrode pad P of the physical quantity sensor 1 via a bonding wire BW1. The IC chip 110 that is a circuit device includes, for example, a drive circuit applying a driving voltage to the physical quantity sensor 1, a detection circuit detecting acceleration based on an output from the physical quantity sensor 1, and an output circuit converting a signal from the detection circuit into a predetermined signal and outputting the predetermined signal as necessary. As described above, since the physical quantity sensor device 100 of the present embodiment includes the physical quantity sensor 1 and the IC chip 110, it is possible to provide the physical quantity sensor device 100 that can achieve the effect of the physical quantity sensor 1 and can realize high accuracy and the like.

The physical quantity sensor device 100 may include a package 120 that is a container in which the physical quantity sensor 1 and the IC chip 110 are stored. The package 120 includes a base 122 and a lid 124. The physical quantity sensor 1 and the IC chip 110 are stored in the storage space SB that is airtightly sealed by bonding the lid 124 to the base 122. The physical quantity sensor 1 and the IC chip 110 can be suitably protected from impact, dust, heat, humidity and the like by providing such a package 120.

The base 122 includes a plurality of internal terminals 130 disposed in the storage space SB, and external terminals 132 and 134 disposed on the bottom surface. The physical quantity sensor 1 and the IC chip 110 are electrically coupled to each other via a bonding wire BW1, and the IC chip 110 and the internal terminals 130 are electrically coupled to each other via a bonding wire BW2. The internal terminals 130 are electrically coupled to the external terminals 132 and 134 via internal wirings (not illustrated) provided in the base 122. Consequently, it is possible to output a sensor output signal based on a physical quantity detected by the physical quantity sensor 1 to the outside.

In the above description, the case where an electronic component provided in the physical quantity sensor device 100 is the IC chip 110 has been described as an example. However, the electronic component may be a circuit element other than the IC chip 110, may be a sensor element different from the physical quantity sensor 1, may be a display element implemented by a liquid crystal display (LCD), a light emitting diode (LED), or the like. As the circuit element, for example, a passive element such as a capacitor or a resistor, or an active element such as a transistor may be used. The sensor element is, for example, an element that senses a physical quantity different from a physical quantity detected by the physical quantity sensor 1. Instead of providing the package 120, mold mounting may be used.

10. Inertial Measurement Unit

Figure 24:
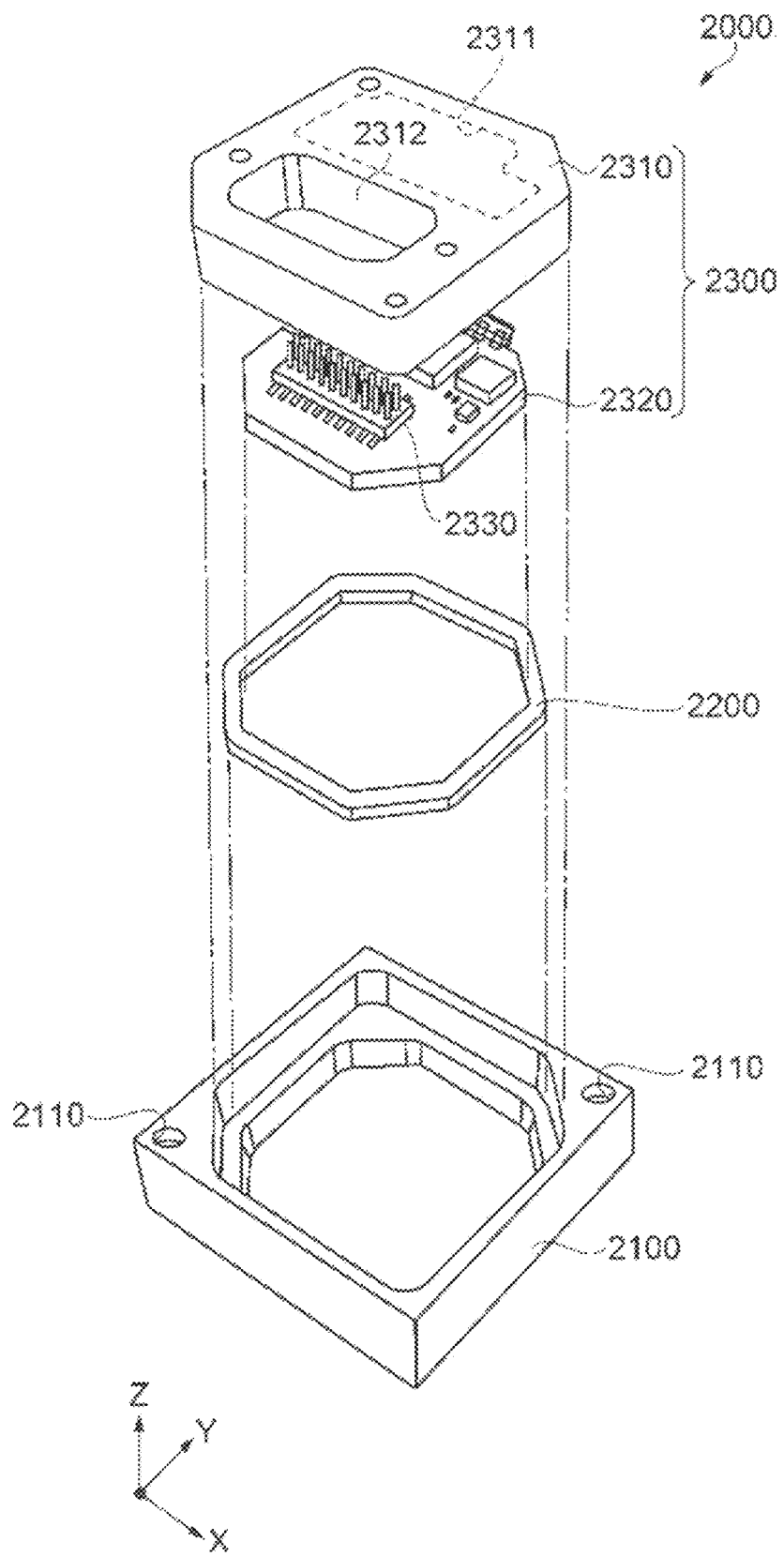
FIG. 24 is an exploded perspective view illustrating a schematic configuration of an inertial measurement unit having a physical quantity sensor.

Next, an inertial measurement unit 2000 of the present embodiment will be described with reference to FIGS. 24 and 25. The inertial measurement unit (IMU) 2000 illustrated in FIG. 24 is a device that detects an amount of inertial motion such a posture or a behavior of a motion body such as an automobile or a robot. The inertial measurement unit 2000 is a so-called six-axis motion sensor that includes acceleration sensors that detect accelerations ax, ay, and az in the directions along the three axes and angular velocity sensors that detect angular velocities ωx, ωy, and ωz about the three axes.

The inertial measurement unit 2000 is a rectangular parallelepiped having a substantially square shape as a planar shape. Screw holes 2110 as mounts are formed in the vicinity of two vertices located in the diagonal direction of the square shape. The inertial measurement unit 2000 can be fixed to a mount surface of a mounting target body such as an automobile by passing two screws through the two screw holes 2110. The inertial measurement unit 2000 can be miniaturized to be mountable on, for example, a smartphone or a digital camera by selecting components and changing the design.

The inertial measurement unit 2000 has an outer case 2100, a bonding member 2200, and a sensor module 2300, and has a configuration in which the sensor module 2300 is inserted inside the outer case 2100 via the bonding member 2200. The sensor module 2300 has an inner case 2310 and a circuit board 2320. The inner case 2310 is provided with a recess 2311 for preventing contact with the circuit board 2320 and an opening 2312 for exposing a connector 2330 that will be described later. The circuit board 2320 is bonded to a lower surface of the inner case 2310 via an adhesive.

Figure 25:
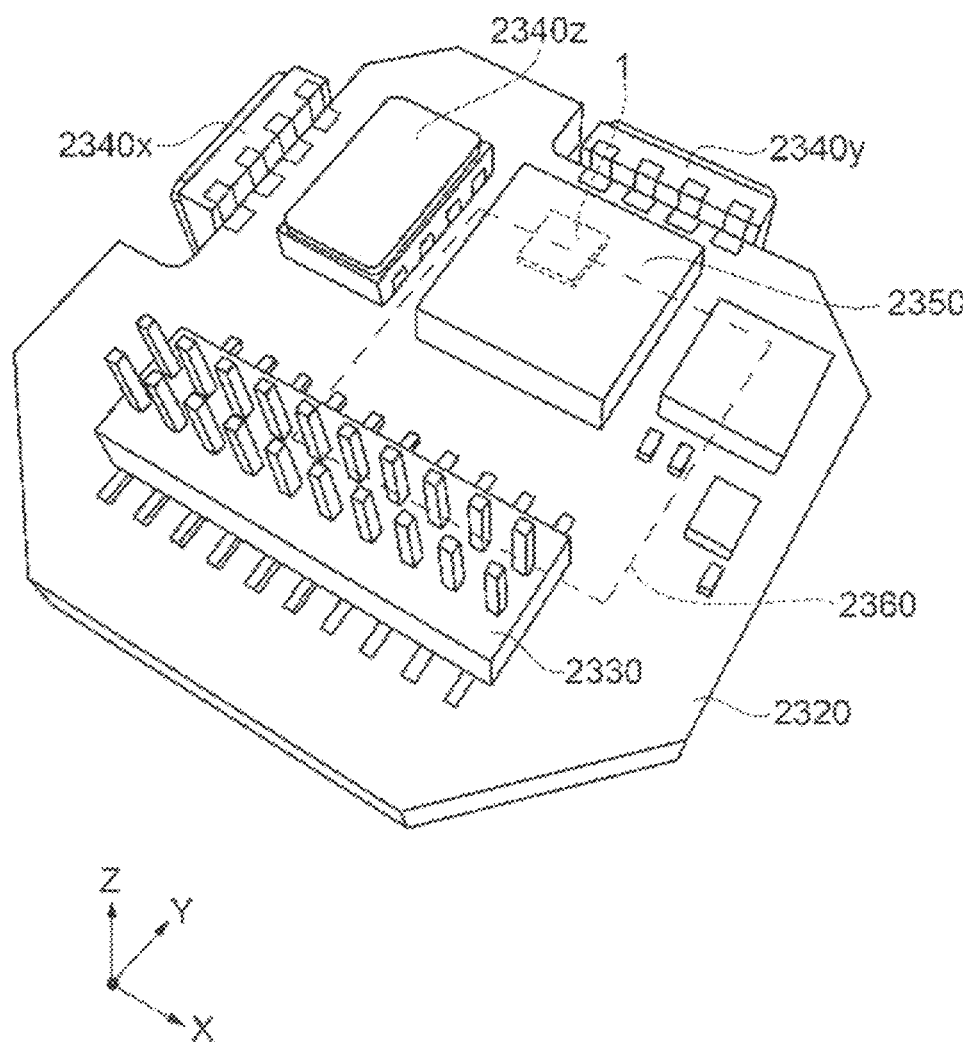
FIG. 25 is a perspective view of a circuit board of a physical quantity sensor.

As illustrated in FIG. 25, the connector 2330, an angular velocity sensor 2340z detecting an angular velocity about the Z axis, and an acceleration sensor unit 2350 detecting an acceleration in each of the X axis, Y axis, and Z axis directions, and the like are mounted on an upper surface of the circuit board 2320. An angular velocity sensor 2340x detecting an angular velocity about the X axis and an angular velocity sensor 2340y detecting an angular velocity about the Y axis are mounted on a side surface of the circuit board 2320.

The acceleration sensor unit 2350 includes at least the above physical quantity sensor 1 measuring an acceleration in the Z axis direction, and may detect an acceleration in a one-axis direction or detect accelerations in two-axis directions or three-axis directions as necessary. The angular velocity sensors 2340x, 2340y, and 2340z are not particularly limited, but may employ, for example, oscillation gyro sensors using the Coriolis force.

A control IC 2360 is mounted on a lower surface of the circuit board 2320. The control IC 2360 as a controller that performs control based on a detection signal output from the physical quantity sensor 1 is, for example, a micro controller unit (MCU), and has a storage including a non-volatile memory, an A/D converter, and the like built thereinto, and controls each constituent of the inertial measurement unit 2000. A plurality of other electronic components are mounted on the circuit board 2320.

As described above, the inertial measurement unit 2000 of the present embodiment includes the physical quantity sensor 1 and the control IC 2360 as a controller that performs control based on a detection signal output from the physical quantity sensor 1. According to the inertial measurement unit 2000, since the acceleration sensor unit 2350 including the physical quantity sensor 1 is used, it is possible to provide the inertial measurement unit 2000 that can achieve the effect of the physical quantity sensor 1 and can realize high accuracy and the like.

As described above, a physical quantity sensor of the present embodiment includes a substrate that is orthogonal to a Z axis when three axes orthogonal to each other are defined as an X axis, a Y axis, and a Z axis, and on which a first fixed electrode is provided, and a movable body that has a first mass portion facing the first fixed electrode in a Z axis direction along the Z axis and is configured to swing with respect to the substrate about a rotation axis along the Y axis. The first mass portion includes a first region and a second region farther from the rotation axis than the first region, a first through-hole group is provided in the first region, and a second through-hole group is provided in the second region. The movable body has a first surface that is a surface on a substrate side and a second surface that is a surface on a rear side with respect to the first surface. The first surface of the first mass portion is provided with a step or a slope such that a first gap distance in the Z axis direction of a first gap that is a gap between the first mass portion and the first fixed electrode in the first region is smaller than a second gap distance in the Z axis direction of a second gap that is a gap between the first mass portion and the first fixed electrode in the second region. A depth in the Z axis direction of through-holes of the first through-hole group and the second through-hole group is smaller than a maximum thickness in the Z axis direction of the movable body.

According to the present embodiment, the first mass portion of the movable body that is swingable about the rotation axis includes the first region in which the first through-hole group is provided and the second region in which the second through-hole group is provided and which is farther from the rotation axis than the first region. A first surface that is a surface of the first mass portion on a substrate side is provided with a step or a slope such that the first gap distance of the first gap in the first region is smaller than the second gap distance of the second gap in the second region. The depth in the Z axis direction of the through-hole of the first through-hole group in the first region and the second through-hole group in the second region is smaller than the maximum thickness in the Z axis direction of the movable body. It is possible to narrow the gap in the first region and thus to realize high sensitivity of the physical quantity sensor by providing the step or the slope such that the first gap distance in the first region is smaller than the second gap distance in the second region as described above. Since the depth of the through-holes of the first through-hole group and the second through-hole group is smaller than the maximum thickness of the movable body, it is possible to reduce hole damping of the through-hole and thus to realize low damping. Therefore, it is possible to provide the physical quantity sensor that can achieve both high sensitivity and low damping.

In the present embodiment, an opening area of the through-hole of the second through-hole group may be larger than an opening area of the through-hole of the first through-hole group.

As described above, since the opening area of the through-hole of the second through-hole group far from the rotation axis is larger than the opening area of the through-hole of the first through-hole group close to the rotation axis, it is possible to satisfy dimensional conditions for the through-hole that can realize low damping and thus to realize low damping of the physical quantity sensor.

In the present embodiment, the depth of the through-holes of the first through-hole group and the second through-hole group may be less than 50% of the maximum thickness in the Z axis direction of the movable body.

Since the depth of the through-hole is less than half of the maximum thickness of the movable body as described above, hole damping in the through-hole can be made sufficiently smaller than when the thickness of the through-hole is equal to the maximum thickness of the movable body, and thus it is possible to realize low damping.

In the present embodiment, when the slope is provided at the first surface of the first mass portion, the first gap distance may increase as a distance from the rotation axis increases in the first region of the first mass portion, and the second gap distance may increase as a distance from the rotation axis increases in the second region of the first mass portion.

As described above, since the slope is provided such that the first gap distance or the second gap distance increases as the distance from the rotation axis increases, it is possible to realize high sensitivity of the physical quantity sensor by narrowing the gap or the like.

In the present embodiment, the movable body may include a fixing portion that is fixed to the substrate, and a support beam that couples the fixing portion to the first mass portion and serves as the rotation axis, and the maximum thickness of the movable body may be a thickness in the Z axis direction of at least one of the fixing portion and the support beam.

In the above-described way, the depth of the through-holes of the first through-hole group and the second through-hole group can be made smaller than the thickness of at least one of the fixing portion and the support beam, and thus hole damping in the through-hole can be reduced.

In the present embodiment, a first recess of which the first through-hole group is disposed in a bottom surface may be provided at the second surface of the movable body in the first region.

As described above, since the first recess is provided in the first region, the rigidity of the movable body in the first region can be increased by walls corresponding to an edge of the first recess, and thus it is possible to avoid the risk of breakage.

In the present embodiment, a second recess of which the second through-hole group is disposed in a bottom surface may be provided at the second surface of the movable body in the second region.

As described above, since the second recess is provided in the second region, the rigidity of the movable body in the second region can be increased by walls corresponding to an edge of the second recess, and thus it is possible to avoid the risk of breakage.

In the present embodiment, a recess of which the second through-hole group is disposed in a bottom surface may be provided at the first surface of the movable body in the second region.

As described above, when the recess is provided at the first surface in the second region, the first gap distance in the first region can be made smaller than the second gap distance in the second region, and the depth of the second through-hole group can be reduced, so that high sensitivity and low damping can be realized.

In the present embodiment, a first recess of which the first through-hole group is disposed in a bottom surface may be provided at the second surface of the movable body in the first region, and a second recess of which the second through-hole group is disposed in a bottom surface may be provided at the first surface of the movable body in the second region.

When the first recess is provided at the second surface in the first region and the second recess is provided at the first surface in the second region as described above, the first gap distance in the first region can be made smaller than the second gap distance in the second region, and the depth of the first through-hole group and the second through-hole group can also be reduced, so that it is possible to realize high sensitivity and low damping.

In the present embodiment, a recess may be provided at the first surface or the second surface of the movable body for each of at least one through-hole of at least one of the first through-hole group and the second through-hole group.

When the recess is provided for each of at least one through-hole as described above, it is possible to further increase the strength of the movable body and ensure the rigidity while realizing low damping.

In the present embodiment, an opening shape of the through-holes of the first through-hole group and the second through-hole group may be a polygonal shape or a circular shape.

As described above, in the present embodiment, even when the opening shape of the through-hole is various shapes, it is possible to realize both high sensitivity and low damping.

In the present embodiment, the second region of the first mass portion may be a torque generator generating a rotational torque about the rotation axis.

In the above-described way, the second region can be used as the torque generator, and thus the physical quantity sensor can be miniaturized.

In the present embodiment, the movable body may include a second mass portion provided with the rotation axis interposed between the first mass portion and the second mass portion in a plan view from the Z axis direction. The substrate may be provided with a second fixed electrode facing the second mass portion, and the second mass portion may include a third region and a fourth region farther from the rotation axis than the third region. A third through-hole group may be provided in the third region, and a fourth through-hole group may be provided in the fourth region. The first surface of the second mass portion may be provided with a step or a slope such that a third gap distance in the Z axis direction of a third gap that is a gap between the second mass portion and the second fixed electrode in the third region is smaller than a fourth gap distance in the Z axis direction of a fourth gap that is a gap between the second mass portion and the second fixed electrode in the fourth region. A depth in the Z axis direction of a through-hole of the third through-hole group and the fourth through-hole group may be smaller than the maximum thickness of the movable body.

It is possible to narrow the gap in the third region and thus to realize high sensitivity of the physical quantity sensor by providing the step or the slope such that the third gap distance in the third region is smaller than the fourth gap distance in the fourth region as described above. Since the depth of the through-hole of the third through-hole group and the fourth through-hole group is smaller than the maximum thickness of the movable body, it is possible to reduce hole damping of the through-hole and thus to realize low damping.

In the present embodiment, when the slope is provided at the first surface of the second mass portion, the third gap distance may increase as a distance from the rotation axis increases in the third region of the second mass portion, and the fourth gap distance may increase as a distance from the rotation axis increases in the fourth region of the second mass portion.

As described above, since the slope is provided such that the third gap distance or the fourth gap distance increases as the distance from the rotation axis increases, it is possible to realize high sensitivity of the physical quantity sensor by narrowing the gap or the like.

In the present embodiment, the movable body may include a torque generator generating a rotational torque about the rotation axis, the torque generator may be provided with a fifth through-hole group, and a fifth gap distance in the Z axis direction of a fifth gap that is a gap between the torque generator and the substrate may be larger than the first gap distance and the second gap distance.

In the above-described way, for example, it is possible to reduce damping and to expand a movable range of the movable body.

In the present embodiment, an opening area of a through-hole of the fifth through-hole group may be larger than the opening area of the through-holes of the first through-hole group and the second through-hole group.

It is possible to further optimally reduce damping in the movable body by increasing the opening area of the through-hole in the torque generator that is far from the rotation axis as described above.

The present embodiment relates to a physical quantity sensor device including the above physical quantity sensor, an electronic component electrically coupled to the physical quantity sensor.

The present embodiment relates to an inertial measurement unit including the above physical quantity sensor and a controller that performs control based on a detection signal output from the physical quantity sensor.

Although the present embodiment has been described in detail as described above, it can be easily understood by those skilled in the art that many modifications that do not substantially depart from the novel matters and effects of the present disclosure are possible. Therefore, all such modification examples are included in the scope of the present disclosure. For example, a term described at least once in the specification or the drawing with a different term in a broader or synonymous manner may be replaced by the different term anywhere in the specification or the drawing. All combinations of the present embodiment and modification examples are also included in the scope of the present disclosure. Configuration and operations of the physical quantity sensor, the physical quantity sensor device, the inertial measurement unit, and the like are not limited to those described in the present embodiment, and are variously modified.

What is claimed is:

1. A physical quantity sensor comprising:
three axes orthogonal to each other being defined as an X axis, a Y axis, and a Z axis;
a substrate;
a first fixed electrode, a second fixed electrode, and a dummy electrode arranged to overlap the substrate in a plan view from a Z-axis direction along the Z-axis; and
a movable body configured to swing with respect to the substrate about a rotation axis extending along the Y axis,
the movable body including:
a first surface and a second surface outwardly opposite to each other, the first surface facing the substrate;
a first mass portion facing the first fixed electrode; and
a second mass portion arranged across the rotation axis from the first mass portion and facing the second fixed electrode,
the first mass portion including:
a first region; and
a second region farther from the rotation axis than the first region along the X axis, the first region and second region sharing a border wall therebetween, the border wall extending along the Z axis; and
a step provided on the first, surface between the first region and the second region, and the step forming a boundary wall extending along the Z axis,
wherein a first gap distance along the Z axis between the first fixed electrode and the first mass portion in the first region is smaller than a second gap distance along the Z axis between the first fixed electrode and the first mass portion in the second region,
the second mass portion including:
a third region; and
a fourth region farther from the rotation axis than the third region along the X axis, the third and fourth regions sharing another border wall therebetween, the another border wall extending along the Z axis,
a first through-hole group is provided in the first region, and a second through-hole group is provided in the second region,
a third through-hole group is provided in the third region, and a fourth through-hole group is provided in the fourth region,
the first fixed electrode is a first detection electrode configured to form a capacitance with the first mass portion,
the second fixed electrode is a second detection electrode configured to form a capacitance with the second mass portion,
the first detection electrode faces the first region and the second region of the first mass portion along the Z axis,
the second detection electrode faces the third region and the fourth region of the second mass portion along the Z axis,
an opening area of each of through-holes of the second through-hole group is larger than an opening area of each of through-holes of the first through-hole group,
the movable body includes a torque generating section disposed on a side of the first mass portion opposite to a side of the second mass portion, and a fifth through-hole group is provided in the torque generating section,
an opening area of each of through-holes of the fifth through-hole group is larger than each of the opening area of each of the through-holes of the first through-hole group and the opening area of each of the through-holes of the second through-hole group, and
the torque generating section faces the dummy electrode.

2. The physical quantity sensor according to claim 1, wherein a first recess is provided in the second surface of the movable body.

3. The physical quantity sensor according to claim 2, wherein the first region is disposed in the first recess.

4. The physical quantity sensor according to claim 3, wherein the second region is disposed in the first recess.

5. The physical quantity sensor according to claim 3, wherein a second recess is provided in the second surface of the movable body.

6. The physical quantity sensor according to claim 5, wherein the second region is disposed in the second recess.

7. The physical quantity sensor according to claim 3, wherein a third recess is provided in the first surface of the movable body.

8. The physical quantity sensor according to claim 1, wherein an opening shape of each of the through-holes of the first through-hole group and the second through-hole group is a polygonal shape or a circular shape.

9. The physical quantity sensor according to claim 1, wherein another first recess is provided in the second surface of the movable body.

10. The physical quantity sensor according to claim 9, wherein the third region is disposed in the another first recess.

11. The physical quantity sensor according to claim 10, wherein the fourth region is disposed in the another first recess.

12. The physical quantity sensor according to claim 10, wherein another second recess is provided in the second surface of the movable body.

13. The physical quantity sensor according to claim 12, wherein the fourth region is disposed in the another second recess.

14. The physical quantity sensor according to claim 1, wherein an opening shape of each of the through-holes of the third through-hole group and the fourth through-hole group is a polygonal shape or a circular shape.

15. The physical quantity sensor according to claim 1, wherein
the dummy electrode has the same potential as the movable body.

16. The physical quantity sensor according to claim 1, further comprising:

another dummy electrode having the same potential as the movable body and arranged on the surface of the substrate facing the movable body, on the opposite side of the rotation axis with respect to the second detection electrode.

17. A physical quantity sensor device comprising:

the physical quantity sensor according to claim 1; and an electronic component that is electrically coupled to the physical quantity sensor.

18. An inertial measurement unit comprising:

the physical quantity sensor according to claim 1; and a controller that performs control based on a detection signal output from the physical quantity sensor.

* * * * *